US008079908B2

(12) United States Patent
Sotoike et al.

(10) Patent No.: US 8,079,908 B2
(45) Date of Patent: Dec. 20, 2011

(54) GAME NETWORK CONSTRUCTION METHOD AND GAME NETWORK SYSTEM

(75) Inventors: Hiroki Sotoike, Kyoto (JP); Tetsuya Nakata, Kyoto (JP); Yusuke Shiraiwa, Kyoto (JP); Yukihiko Itoh, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 931 days.

(21) Appl. No.: 12/078,610

(22) Filed: Apr. 2, 2008

(65) Prior Publication Data
US 2009/0197682 A1    Aug. 6, 2009

(30) Foreign Application Priority Data

Feb. 5, 2008 (JP) ................................ 2008-025463

(51) Int. Cl.
*A63F 9/24* (2006.01)
*G06F 15/16* (2006.01)
(52) U.S. Cl. ............................ 463/42; 709/227; 709/223
(58) Field of Classification Search .................. 709/223, 709/227; 463/42; 370/400, 360, 392, 408
See application file for complete search history.

(56) References Cited

U.S. PATENT DOCUMENTS

| | | | |
|---|---|---|---|
| 2003/0231624 A1* | 12/2003 | Alappat et al. | 370/360 |
| 2003/0235175 A1 | 12/2003 | Naghian et al. | |
| 2004/0162144 A1* | 8/2004 | Loose et al. | 463/42 |
| 2006/0268908 A1 | 11/2006 | Wang et al. | |
| 2007/0195808 A1* | 8/2007 | Ehrlich et al. | 370/408 |
| 2007/0250613 A1* | 10/2007 | Gulledge | 709/223 |
| 2008/0101384 A1* | 5/2008 | Lee | 370/400 |
| 2008/0293494 A1* | 11/2008 | Adiraju et al. | 463/42 |
| 2010/0085969 A1* | 4/2010 | Aoki et al. | 370/392 |

FOREIGN PATENT DOCUMENTS

| | | |
|---|---|---|
| EP | 635 958 | 1/1995 |
| WO | 2005/111871 | 11/2005 |

OTHER PUBLICATIONS

Jung Wun-Chul, "Online Game Programming", *Softbank Publishing, Inc.*, Mar. 3, 2005, first edition, pp. 218-222 (with English translation).

* cited by examiner

*Primary Examiner* — Jungwon Chang
(74) *Attorney, Agent, or Firm* — Nixon & Vanderhye P.C.

(57) ABSTRACT

After a star peer-to-peer network is constructed, a network game is started. While the network game is executed, a mesh peer-to-peer network is gradually constructed by establishing connections between client terminals which have been connected to the star peer-to-peer network. After the network game is started, while the mesh peer-to-peer network is constructed, client terminals which have established connections therebetween transmit and receive game data to and from each other without passing via a host terminal, and client terminals which have not established connections therebetween yet transmit and receive game data to and from each other via the host terminal. Thus, a game network system can be realized, in which a time during which players wait for the network game to start is short and in which processing burdens are not concentrated on a specific user terminal.

15 Claims, 23 Drawing Sheets

F I G. 1
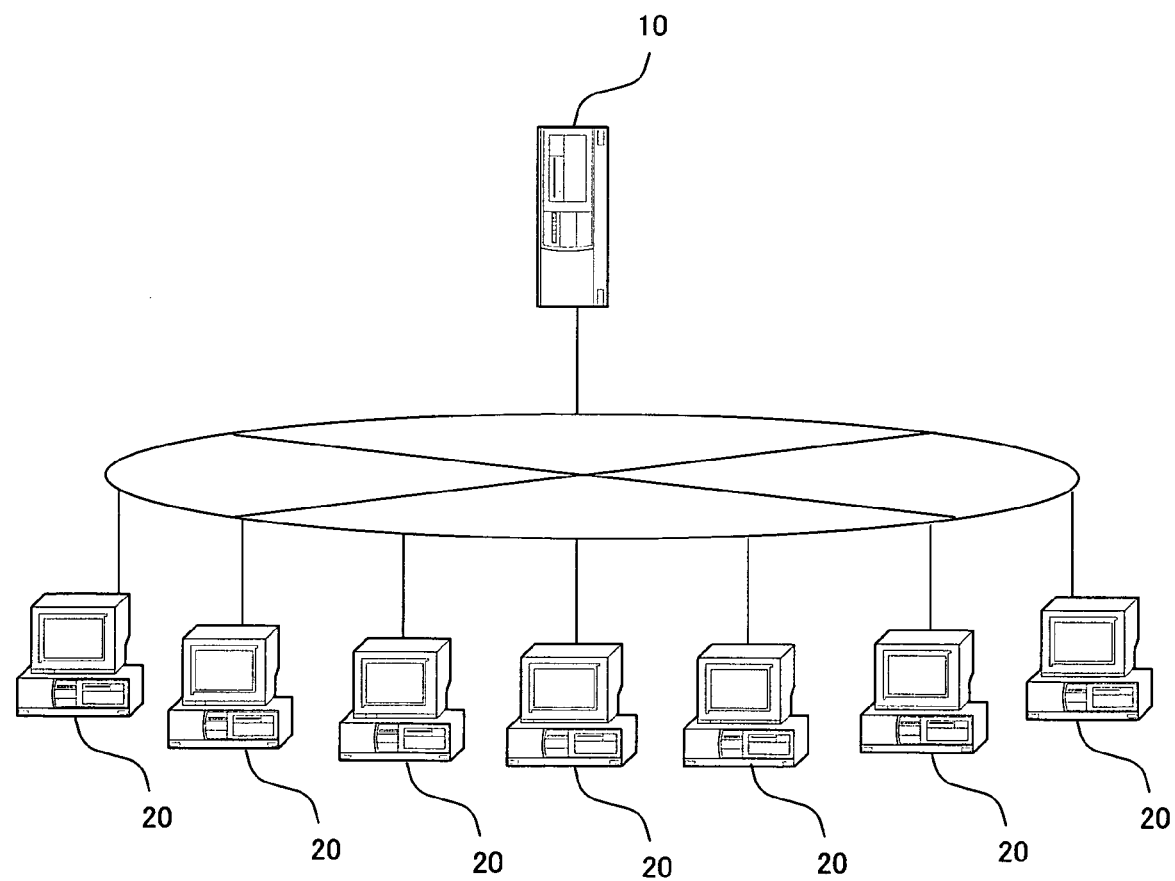

USER TERMINAL INFORMATION

| TERMINAL ID | IP ADDRESS | HOST FLAG | USER ID | SKILL LEVEL |
|---|---|---|---|---|
| AAA | ###.###.###.### | O | 111 | 5 |
| BBB | ###.###.###.### | — | 222 | 3 |
| CCC | ###.###.###.### | — | 333 | 1 |
| DDD | ###.###.###.### | — | 444 | 5 |
| EEE | ###.###.###.### | — | 555 | 5 |
| FFF | ###.###.###.### | — | 666 | 1 |
| GGG | ###.###.###.### | O | 777 | 2 |
| HHH | ###.###.###.### | — | 888 | 4 |
| JJJ | ###.###.###.### | O | 999 | 3 |
| ⋮ | ⋮ | ⋮ | ⋮ | ⋮ |

F I G. 1 1
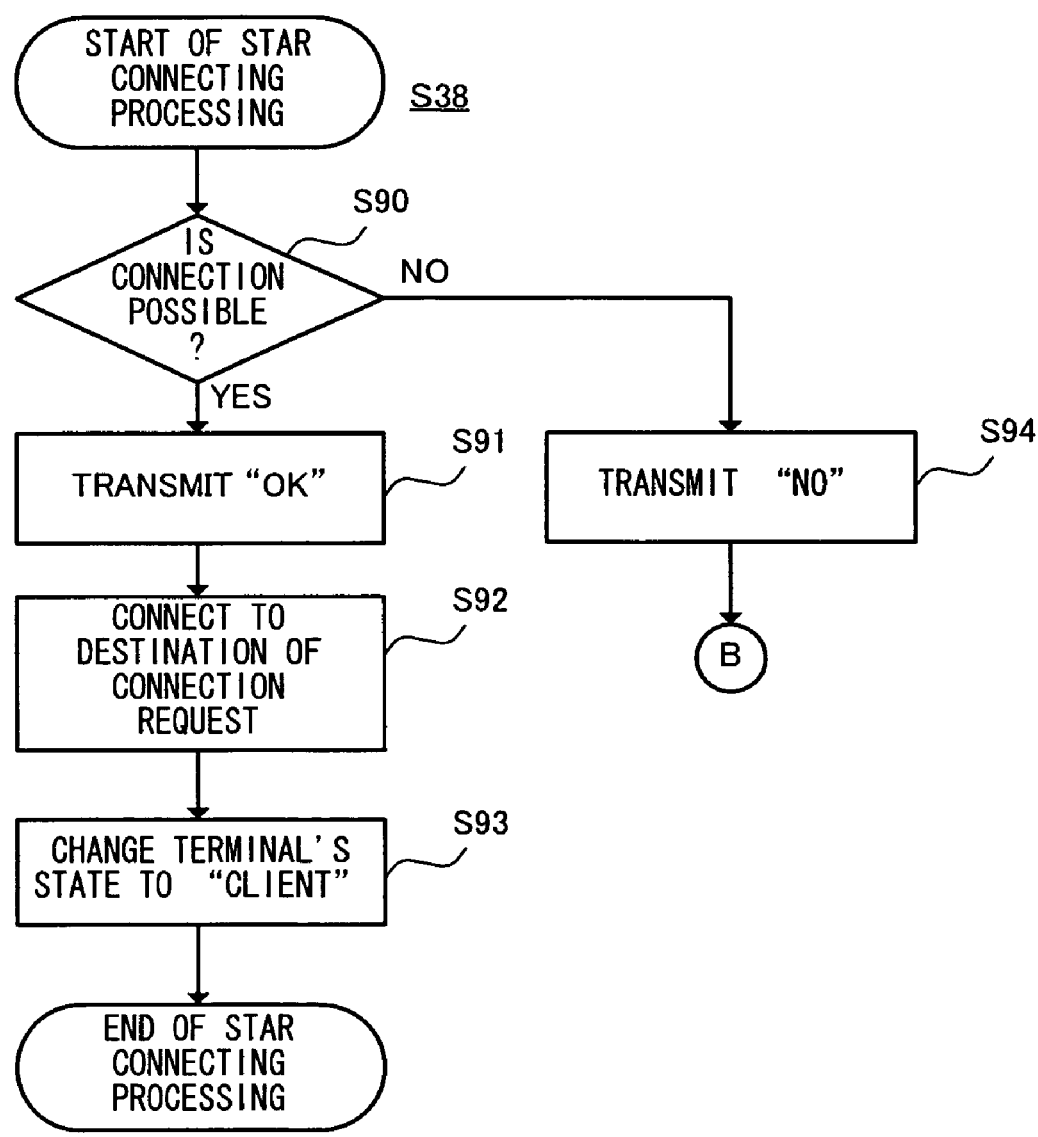

F I G. 1 5 E
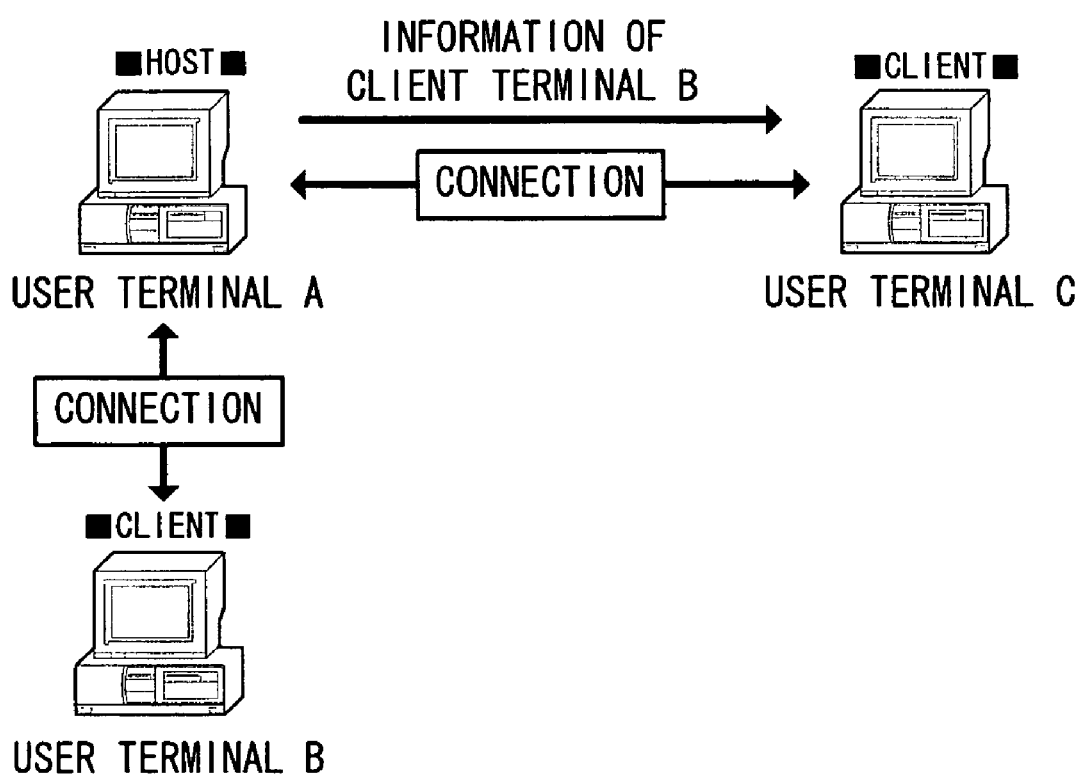

| TERMINAL | TERMINAL INFORMATION POSSESSED BY EACH TERMINAL | | |
|---|---|---|---|
| USER TERMINAL A (XXX.XXX.XXX.XXX) | | USER TERMINAL B (XXX.XXX.XXX.XXX) | USER TERMINAL C (XXX.XXX.XXX.XXX) |
| USER TERMINAL B (XXX.XXX.XXX.XXX) | USER TERMINAL A (XXX.XXX.XXX.XXX) | | USER TERMINAL C (XXX.XXX.XXX.XXX) |
| USER TERMINAL C (XXX.XXX.XXX.XXX) | USER TERMINAL A (XXX.XXX.XXX.XXX) | USER TERMINAL B (XXX.XXX.XXX.XXX) | |

FIG. 20

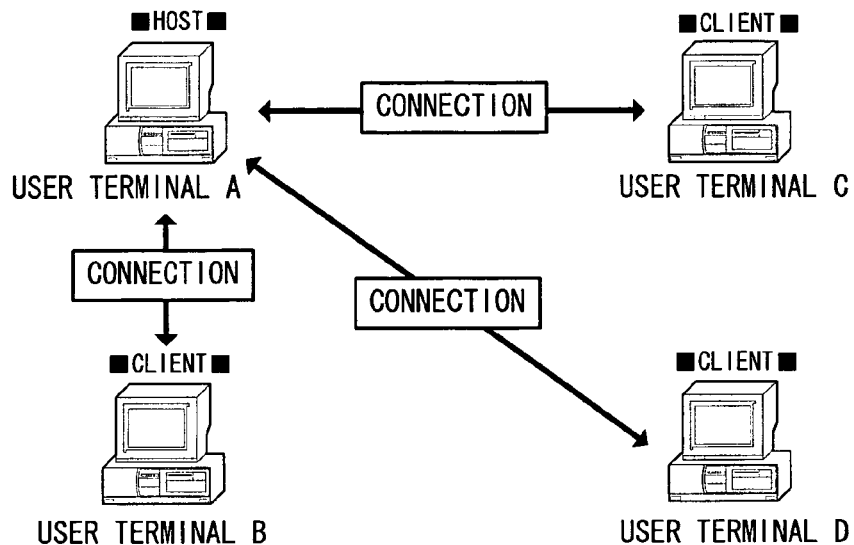

FIG. 21

| TERMINAL | TERMINAL INFORMATION POSSESSED BY EACH TERMINAL | | | |
|---|---|---|---|---|
| USER TERMINAL A (XXX.XXX.XXX.XXX) | | USER TERMINAL B (XXX.XXX.XXX.XXX) | USER TERMINAL C (XXX.XXX.XXX.XXX) | USER TERMINAL D (XXX.XXX.XXX.XXX) |
| USER TERMINAL B (XXX.XXX.XXX.XXX) | USER TERMINAL A (XXX.XXX.XXX.XXX) | | USER TERMINAL C (XXX.XXX.XXX.XXX) | USER TERMINAL D (XXX.XXX.XXX.XXX) |
| USER TERMINAL C (XXX.XXX.XXX.XXX) | USER TERMINAL A (XXX.XXX.XXX.XXX) | USER TERMINAL B (XXX.XXX.XXX.XXX) | | USER TERMINAL D (XXX.XXX.XXX.XXX) |
| USER TERMINAL D (XXX.XXX.XXX.XXX) | USER TERMINAL A (XXX.XXX.XXX.XXX) | USER TERMINAL B (XXX.XXX.XXX.XXX) | USER TERMINAL C (XXX.XXX.XXX.XXX) | |

GAME NETWORK CONSTRUCTION METHOD AND GAME NETWORK SYSTEM

CROSS REFERENCE TO RELATED APPLICATION

The disclosure of Japanese Patent Application No. 2008-025463, filed on Feb. 5, 2008, is incorporated herein by reference.

BACKGROUND OF THE INVENTION

1. Field of the Invention

The present invention relates to a game network construction method and a game network system, and in particular, to a game network construction method and a game network system for a game which is executed via a communication network.

2. Description of the Background Art

Conventionally, as a game system performed via a communication network, there exists a technique disclosed in a Non-Patent Document 1 (Jung WunChul, "Online Game Programming", SOFTBANK Publishing Corp., first edition, Mar. 3, 2005, Pages 218-222). The Non-Patent Document 1 describes a method of constructing a peer-to-peer network. In a peer-to-peer network game system, a game basically advances while communication is performed between user terminals. Thus, the peer-to-peer network game system does not need a high-performance game server unlike a server/client type network game system. In addition, the peer-to-peer network game system can perform data transfer between the user terminals without passing via a game server, and hence is suitable for a network game, such as a racing game, which needs real-time processing.

Generally, there are two main types of the peer-to-peer networks. One of them is a star network in which a user terminal serves as a host and in which other user terminals (client terminals) transmit and receive data to and from each other via the host terminal (see FIG. 22). The other type is a mesh network in which all of user terminals can transmit and receive data to and from each other without passing via a specific host terminal (see FIG. 23).

With reference to FIGS. 24 and 25, a method of constructing a conventional mesh peer-to-peer network will be described briefly. FIG. 24 is a flow chart showing processing executed by a host terminal, and FIG. 25 is a flow chart showing processing executed by a client terminal.

As shown in FIG. 24, a host terminal creates a game session at a step S900, and resets a player list at a step S901. The player list is a list including terminal information (address information, and the like) of all user terminals which belong to the same network. At a step S902, the host terminal determines whether or not a game is to be started. When the game is to be started (e.g. when a constant number of user terminals are connected to the network), the host terminal proceeds to a step S907. When the game is not to be started, the host terminal proceeds to a step S903. At the step S903, the host terminal determines whether or not the host terminal has received a connection request signal from another user terminal (a user terminal which is to be newly added to the network). When the host terminal has received the connection request signal, the host terminal proceeds to a step S904. When the host terminal has not received the connection request signal yet, the host terminal returns to the step S902. At the step S904, the host terminal adds to the player list terminal information of the user terminal which is a source of the connection request signal. At a step S905, the host terminal transmits the updated player list to all of the client terminals which belong to the same network. At a step S906, the host terminal connects to the user terminal which is the source of the connection request signal, and then returns to the step S902. At the step S907, the host terminal transmits a game start signal to all of the client terminals which belong to the same network, and then a network game is started.

As shown in FIG. 25, the client terminal selects a game session from a plurality of game sessions, which are created by a plurality of host terminals, respectively, at a step S910, and receives a player list from the host terminal of the selected game session at a step S911. At a step S912, based on the received player list, the line terminal connects to a user terminal (the host terminal or a client terminal), terminal information of which is included in the player list. At a step S913, the client terminal determines whether or not the client terminal has received the game start signal from the host terminal. When the client terminal has received the game start signal, the network game is started. When the client terminal has not received the game start signal yet, the client terminal proceeds to a step S914. At the step S914, the client terminal determines whether or not the client terminal has received the player list from the host terminal. When the client terminal has received the player list, the client terminal proceeds to the step S912. When the client terminal has not received the player list yet, the client terminal proceeds to the step S913.

When the mesh peer-to-peer network is constructed as described above and the network game is started, each user terminal executes game processing while transmitting and receiving data to and from the other user terminals directly (i.e. without passing via the host terminal).

Meanwhile, the star peer-to-peer network has an advantage that a time after a start of constructing a network until a completion thereof (i.e. until transmission and reception of data become possible between user terminals) is short. However, the star peer-to-peer network has a problem that communication delay is large since transmission and reception of data have to be performed via the host terminal, and also has a problem that communication performance between the client terminals depends on performance of the host terminal and network line condition.

On the other hand, in the mesh peer-to-peer network, transmission and reception of data between the client terminals are performed without passing via the host terminal, and thus the above problems do not arise. However, the mesh peer-to-peer network has a problem that it takes time until all of the user terminals connect to each other. Especially, for a network game in which a number of concurrently connected terminals is large, the mesh peer-to-peer network has a problem that users are made to wait for the game to start for a long time. Further, since connections between all of the user terminals have to be successful, the mesh peer-to-peer network has a problem that there is a high possibility that network construction fails compared to the star peer-to-peer network.

SUMMARY OF THE INVENTION

Therefore, an object of the present invention is to provide a method of constructing a game network system and a game network system, in which a waiting time until start of play is short and processing burdens are not concentrated on a specific user terminal.

The present invention has the following features to attain the object mentioned above. It is noted that reference numerals in parentheses are merely provided to facilitate the understanding of the present invention in relation to the drawings, rather than limiting the scope of the present invention in any way.

A game network construction method according to the present invention is a game network construction method for a network game system comprising a plurality of user terminals (20). The method comprises a first construction step (S33, S38), a game start step (S30), a second construction step (S24, S27), and a game data reception/transmission step (S100 to S102, S110, S111, S113). The first construction step is a step of constructing a star peer-to-peer network in which one of the plurality of user terminals is set as a host terminal and the other of the plurality of user terminals are set as client terminals. The game start step is a step of starting a network game in a plurality of user terminals which have been connected to the star peer-to-peer network. The second construction step is a step of constructing a mesh peer-to-peer network from the star peer-to-peer network by sequentially establishing connections between the client terminals which have been connected to the star peer-to-peer network. The game data reception/transmission step is a step of, while the mesh peer-to-peer network is constructed after the network game is started, (a) performing transmission and reception of game data, which is required for the network game to advance, between client terminals which have established a connection therebetween, without passing via the host terminal, and (b) performing transmission and reception of game data, which is required for the network game to advance, between client terminals which have not established a connection therebetween yet, via the host terminal by transfer processing of the host terminal.

At the second construction step, each client terminal preferentially connects to a client terminal, which has been connected to the star peer-to-peer network at the earliest time, among the other client terminals which have been connected to the star peer-to-peer network.

At the second construction step, each client terminal preferentially connects to a client terminal, to which the most other client terminals have been connected, among the other client terminals which have been connected to the star peer-to-peer network.

The game network construction method further comprises a new connection step of connecting, as a new client terminal, a user terminal which has not been connected to the star peer-to-peer network yet to the star peer-to-peer network while the mesh peer-to-peer network is constructed after the network game is started. At the second construction step, a mesh peer-to-peer network including the new client terminal is constructed.

The network game, which is executed at the game start step, includes game preparation processing in which settings concerning the network game are made after the network game is started and continues until a predetermined condition is satisfied.

At the game start step, the network game is started in a plurality of user terminals, which have been connected to the star peer-to-peer network, when a predetermined time period elapses after the star peer-to-peer network starts to be constructed.

At the game start step, the network game is started in a plurality of user terminals, which have been connected to the star peer-to-peer network, at a time when a number of user terminals connected to the star peer-to-peer network reaches a predetermined number.

At the game start step, the network game is started in a plurality of user terminals, which have been connected to the star peer-to-peer network, in accordance with a game start signal which is transmitted from the host terminal to the client terminals.

The host terminal transmits the game start signal to the client terminals in accordance with a game start instruction inputted from an input section which is provided in the host terminal.

A game network system according to the present invention is a game network system comprising a plurality of user terminals. Each user terminal includes first connection means, game start means, second connection means, and game data reception/transmission means. The first connection means is means for connecting as a host terminal or a client terminal to a star peer-to-peer network in which one of the plurality of user terminals is set as a host terminal and the other of the plurality of user terminals are set as client terminals. The game start means is means for starting a network game after connecting to the star peer-to-peer network. The second connection means is means for sequentially establishing connections to other client terminals, which has been connected to the star peer-to-peer network, after connecting as a client terminal to the star peer-to-peer network. The game data reception/transmission means is means for, after the network game is started, (a) transmitting and receiving game data, which is required for the network game to advance, to and from a client terminal, which has established a connection to said each user terminal, without passing via the host terminal, and (b) transmitting and receiving game data, which is required for the network game to advance, to and from a client terminal, which has not established a connection to said each user terminal yet, via the host terminal by transfer processing of the host terminal.

According to the present invention, the network game can be started at a time when the star peer-to-peer network is constructed. Thus, a time during which players wait for the network game to start is short. In addition, the mesh peer-to-peer network is gradually constructed from the star peer-to-peer network during playing the network game. Thus, a processing burden on the host terminal during playing the network game is reduced, and a transfer time of game data required for the network game to advance can be reduced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view showing a configuration of a game network system according to an embodiment of the present invention;

FIG. 11 is a flow chart showing a procedure of star connecting processing of the network construction program;

FIG. 15E is a view showing the process of the peer-to-peer network being constructed;

FIG. 20 is a view showing a process of a peer-to-peer network being constructed.

FIG. 21 is a view showing terminal information held by each terminal;

DESCRIPTION OF THE PREFERRED EMBODIMENTS

The following will describe an embodiment of the present invention with reference to the drawings.

FIG. 20 is a view showing a configuration of a game network system according to the embodiment of the present invention. The game network system includes an address information server 10 and a plurality of user terminals (game apparatuses) 20.

Figure 2:
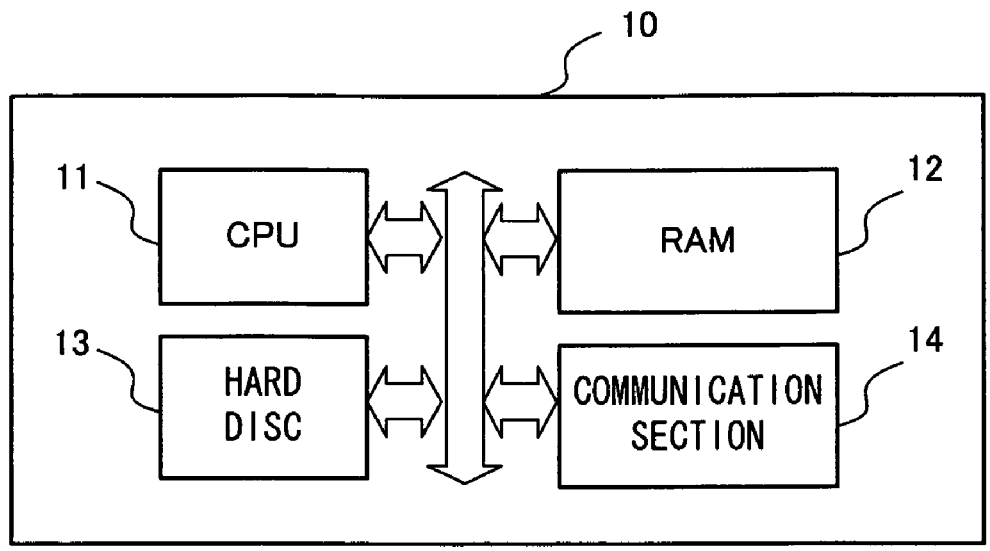
FIG. 2 illustrates a typical exemplary configuration of an address information server 10.

FIG. 2 illustrates a typical exemplary configuration of the address information server 10. The address information server 10 includes a CPU 11, a RAM 12, a hard disc 13, and a communication section 14. The CPU 11 loads a computer program, which is stored in the hard disc 13, into the RAM 12 for execution. Main functions of the address information server 10, which are implemented by the computer program, are to receive periodically later-described user terminal information (see FIG. 4) from each user terminal 20 and store them in the RAM 12, and to transmit, in accordance with a request from the user terminal 20 based on the terminal information, an address information list to the user terminal 20.

Figure 3:
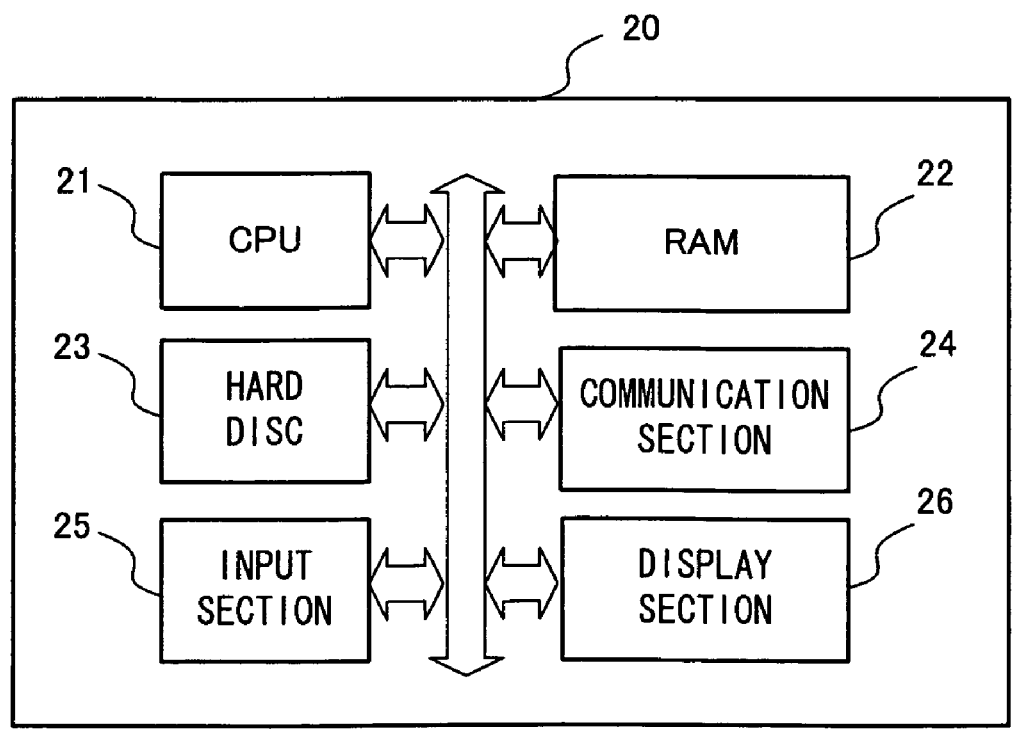
FIG. 3 illustrates a typical exemplary configuration of a user terminal 20.

FIG. 3 illustrates a typical exemplary configuration of the user terminal 20. The user terminal 20 includes a CPU 21, a RAM 22, a hard disc 23, a communication section 24, an input section 25, and a display section 26. The CPU 21 loads a network game program, which is stored in the hard disc 23, into the RAM 22 for execution. It is noted that although it is described that the network game program is stored in advance in the hard disc 23, the present invention is not limited thereto. Alternatively, the network game program may be supplied to the user terminal 20 through an external storage medium such as a memory card, a cartridge, a DVD-ROM, and the like, or the network game program may be supplied to the user terminal 20 through the communication section 24. Main functions of the user terminal 20, which are implemented by the network game program, are to construct a peer-to-peer network which allows a plurality of players to play a game together, and to execute a video game such as a racing game, and the like while transmitting and receiving game data to and from the other user terminals 20 which belong to the constructed peer-to-peer network. The input section 25 is used for game operations, and the display section 26 is used for displaying game images.

Figures 4, 5:
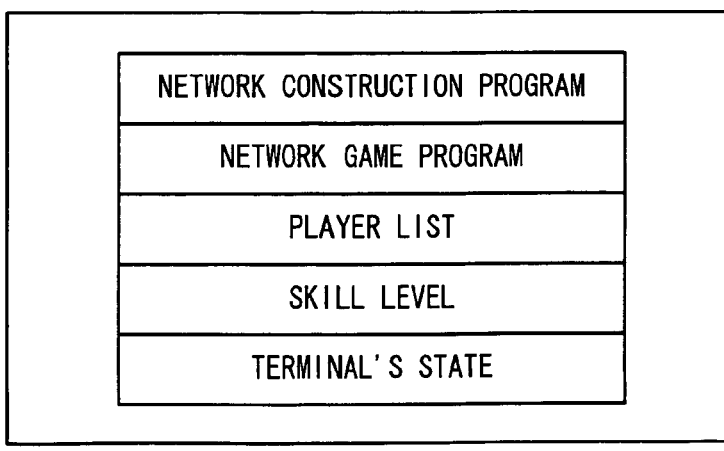
FIG. 4 illustrates an example of user terminal information stored in a RAM 12 of the address information server 10.
FIG. 5 illustrates an example of a memory map of a RAM 22 of the user terminal 20.

FIG. 4 illustrates an example of user terminal information stored in the RAM 12 of the address information server 10. The user terminal information is updated based on information which is transmitted from each user terminal 20. The user terminal information includes terminal information (an terminal ID, an IP address, a host flag, a user ID, and information of a skill level) of each user terminal 20. The terminal ID is information for identifying a user terminal 20. The IP address is address information for accessing the user terminal 20 by using a TCP/IP protocol, and includes port number information. The host flag indicates whether or not the user terminal 20 operates as a host terminal (or the user terminal 20 is capable of operating as a host terminal in accordance with a connection request from another user terminal 20). The user ID is information for identifying a user who plays a game with the user terminal 20. The skill level indicates a skill level of the user for a game by using a numeric value. For example, if the user finishes a race in a high place in a racing game, a value of the skill level is increased. In addition, if the user finishes a race in a higher place than a user having a higher skill level, an increase amount is increased.

FIG. 5 illustrates an example of a memory map of the RAM 22 of the user terminal 20. In the RAM 22 are stored the network construction program and the network game program, which are loaded from the hard disc 23, a player list, the skill level of a player, and a terminal's state. The player list, the skill level of the player, and the terminal's state are updated as appropriate. The player list is a list of the terminal information of the user terminals which participate the same game network. The terminal information of each user terminal, which is included in the player list, includes information such as a user ID and a skill level of each user, an IP address of the user terminal 20 of the user, a connection flag indicative of whether or not a connection to the user terminal 20 of the user has been established, and the like. In the player list, terminal information of a host terminal is at a head thereof, and terminal information of a client terminal is sequentially added to the player list in order of connection to the host terminal. Thus, from alignment sequence of the terminal information in the player list, in which order client terminals are connected to the host terminal can be recognized. The terminal's state indicates a role of the user terminal 20 in a network by using any of "HOST", "CLIENT", and "NULL". When the terminal's state is updated in the user terminal 20, information of a new terminal's state is transmitted from the user terminal 20 to the address information server 10, and reflected in the host flag of the terminal information which is stored in the RAM 12 of the address information server 10.

The following will describe an operation of the user terminal 20.

Prior to the detailed description of the operation of the user terminal 20, an outline of a game network construction method according to the present embodiment will be described. In the present embodiment, a star peer-to-peer network is constructed, in which one of the plurality of user terminals 20 is set as a host terminal and in which the other user terminals 20 are set as client terminals. When a predetermined condition is satisfied (for example, when a predetermined number of user terminals 20 are connected to the star peer-to-peer network), a network game is started in these user terminals 20. In addition, while the network game advances, processing of constructing a mesh peer-to-peer network from the star peer-to-peer network is executed. This processing is executed by establishing connections between the client terminals which have been connected to the star peer-to-peer network. In this way, while the network game advances, the mesh peer-to-peer network is gradually constructed, and finally completed. It is noted that according to need, a peer-to-peer network in which connections between all of the client terminals are established is referred to a "complete mesh peer-to-peer network", and a peer-to-peer network in which connections between only some of the client terminals are established is referred to an "incomplete mesh peer-to-peer network".

With reference to FIGS. 6 to 11, the following will describe a procedure of processing executed by the CPU 21 of the user terminal 20 (for the sake of convenience, referred to as a "user terminal A") based on the network construction program.

Figure 6:
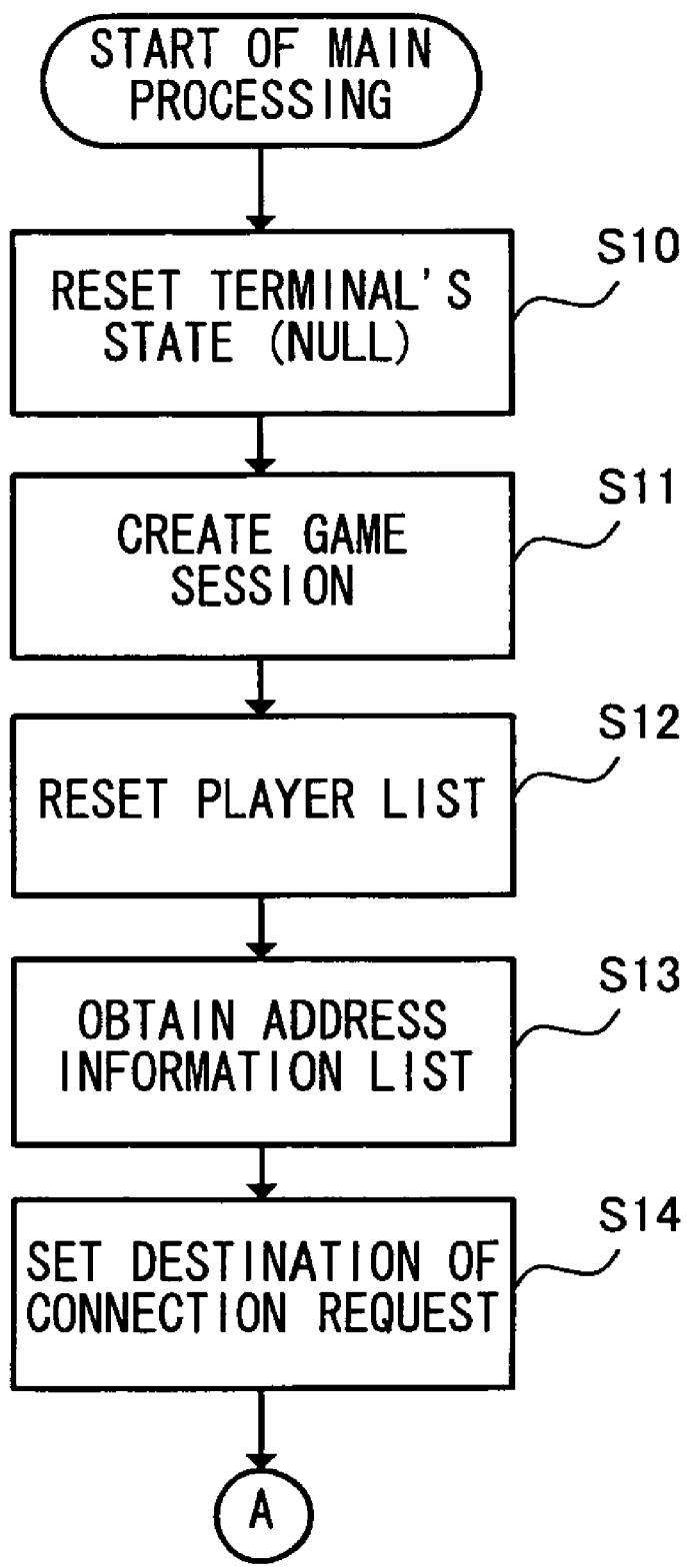
FIG. 6 is a flow chart showing a procedure of main processing of a network construction program.

FIG. 6 is a flow chart showing a procedure of main processing of the network construction program. When the main processing is started, the CPU 21 resets the terminal's state, which is stored in the RAM 22, to be "NULL" at a step S10.

At a step S11, the CPU 21 creates a game session.

At a step S12, the CPU 21 resets the player list which is stored in the RAM 22.

At a step S13, the CPU 21 requests the address information list from the address information server 10 via the communication section 24. To describe one concrete example, when the CPU 21 requests the address information list from the address information server 10, the CPU 21 transmits the information of the skill level (here, the skill level is assumed as "2"), which is stored in the RAM 22, to the address information server 10. Then, the CPU 11 of the address information server 10 extracts, from the user terminal information shown in FIG. 4, at least one piece of terminal information in which the host flag is set to "ON" and the skill level has a numeric value (e.g. 1, 2, or 3) close to 2. The CPU 11 transmits a list of information of the extracted terminal as an address information list to the user terminal A.

At a step S14, the CPU 21 extracts one piece of terminal information from the address information list which is obtained from the address information server 10, and sets a user terminal 20 (for the sake of convenience, referred to as a "user terminal B"), which corresponds to the extracted terminal information, as a destination of a connection request (temporarily stored in the RAM 22). A conceivable manner of extracting one piece of terminal information from the address information list includes extracting one piece of terminal information based on any indicator (a skill level, a device ID, a player ID, and the like), and extracting one piece of terminal information in a random manner. For example, one piece of terminal information having a skill level closest to the skill level which is stored in the RAM 22 may be extracted. When there is a plurality of pieces of terminal information each having a skill level closest to the skill level which is stored in the RAM 22, one piece of terminal information may be extracted therefrom in a random manner. When the step S14 is completed, the CPU 21 proceeds to a step S20 in FIG. 7.

At the step S20, the CPU 21 transmits a connection request signal to the user terminal B by using an IP address of the user terminal B which is included in the terminal information which is extracted at the step S14. The transmitted connection request signal is a connection request signal for constructing a star peer-to-peer network.

At a step S21, the CPU 21 determines whether or not the terminal's state, which is stored in the RAM 22, is "CLIENT". When the terminal's state is "CLIENT", the CPU 21 proceeds to a step S22. When the terminal's state is not "CLIENT" (i.e. when the terminal's state is "NULL" or "HOST"), the CPU 21 proceeds to a step S32.

At the step S22, the CPU 21 refers to the player list which is stored in the RAM 22, and determines whether or not among the other client terminals which are connected to the peer-to-peer network (any of star, incomplete mesh, and complete mesh peer-to-peer networks) to which the user terminal 20 thereof (the user terminal A) belongs, there is a client terminal which has not established a connection to the user terminal A yet. When there is the client terminal which has not established the connection to the user terminal A yet, the CPU 21 proceeds to a step S23. When there is no client terminal which has not established a connection to the user terminal A (i.e. when all connections between the user terminal A and the other client terminals have been established) yet, the CPU 21 proceeds to a step S28.

The steps S23 to S27 are processing for constructing a mesh peer-to-peer network from a star peer-to-peer network by establishing connections between client terminals which are connected to the star peer-to-peer network.

At the step S23, the CPU 21 determines whether or not the CPU 21 has received a connection request signal (a connection request signal for constructing a mesh peer-to-peer network) from another client terminal. When the CPU 21 has received the connection request signal from the other client terminal, the CPU 21 proceeds to the step S24. When the CPU 21 has not received the connection request signal from the other client terminal yet, the CPU 21 proceeds to the step S25.

At the step S24, the CPU 21 executes mesh connected processing. The mesh connected processing is a series of processing which is executed when the user terminal A receives the connection request signal (the connection request signal for constructing a mesh peer-to-peer network) from the other client terminal (here, a client terminal C). With reference to a flow chart in FIG. 8, the following will describe the mesh connected processing.

When the mesh connected processing is started, at a step S50, the CPU 21 determines whether or not to a connection request from the other client terminal (for the sake of convenience, referred to as a "client terminal C"), which is a source of the connection request signal, is acceptable (i.e. whether or not to establish a connection between the user terminal A and the client terminal C). When the connection request is acceptable, the CPU 21 proceeds to a step S51. When the connection request is not acceptable, the CPU 21 proceeds to a step S58. It is noted there may be a situation where the user terminal A has not received yet, from the client terminal D, a response signal for a connection request signal which has been transmitted from the user terminal A to another client terminal (for the sake of convenience, referred to as a "client terminal D") at a later-described step S25. In this situation, based on predetermined criteria, the CPU 21 determines whether or not the connection request from the client terminal C is acceptable. For example, determination may be made based on a comparison in magnitude between a terminal ID of the client terminal C and a terminal ID of the client terminal D. Alternatively, determination may be made based on a comparison in magnitude between a user ID of a user using the client terminal C and a user ID of a user using the client terminal D. As another example, in the situation where the user terminal A has not received the response signal from the client terminal D yet, the CPU 21 may always reject the connection request from the client terminal C, or may always accept the connection request from the client terminal C (i.e. may prioritizes establishment of a connection to the client terminal C over establishment of a connection to the client terminal D).

At the step S51, the CPU 21 transmits a response signal indicative of "PERMISSION" to the client terminal C.

At a step S52, the CPU 21 determines whether or not there is a need to execute cancellation processing. When there is the need to execute the cancellation processing, the CPU 21 proceeds to a step S53. When there is no need to execute the cancellation processing, the CPU 21 proceeds to a step S54. Here, the cancellation processing is processing for notifying the client terminal D of cancellation of the connection request when the CPU 21 determines at the step S50 that the connection request from the client terminal C is acceptable before receiving, from the client terminal D, the response signal for the connection request signal which has been transmitted from the user terminal A to another client terminal (here, the client terminal D) at the later-described step S25. The cancellation processing may be also executed when a connection cancellation instruction is inputted by a player.

At the step S53, the CPU 21 transmits a cancellation signal to the client terminal D.

At the step S54, the CPU 21 determines whether or not the CPU 21 has received a connection determination signal from the client terminal C. When the CPU 21 has received the connection determination signal, the CPU 21 proceeds to a step S56. When the CPU 21 has not received the connection determination signal yet, the CPU 21 proceeds to a step S55.

At the step S55, the CPU 21 determines whether or not the CPU 21 has received a cancellation signal from the client terminal C. When the CPU 21 has received the cancellation signal from the client terminal C, the CPU 21 terminates the mesh connected processing. When the CPU 21 has not received the cancellation signal from the client terminal C yet, the CPU 21 returns to the step S54.

At the step S56, the CPU 21 determines whether or not the connection determination signal received from the client terminal C is indicative of "OK". When the connection determination signal is indicative of "OK", the CPU 21 proceeds to a step S57. When the connection determination signal is indicative of "NO", the CPU 21 terminates the mesh connected processing.

At the step S57, the CPU 21 establishes a connection to the client terminal C. Thus, the user terminal A and the client terminal C are capable of transmitting and receiving game data to and from each other without passing via the host terminal. The establishment of the connection to the client terminal C is stored by the connection flag which is included in the aforementioned player list.

At the step S58, the CPU 21 transmits a response signal indicative of "REJECTION" or "WAIT" to the client terminal C, and terminates the mesh connected processing. The response signal indicative of "REJECTION" is transmitted when the CPU 21 completely rejects the connection request from the client terminal C. Typically, the response signal indicative of "REJECTION" is transmitted when a number of client terminals which are connected to the client terminal C exceeds a predetermined maximum number of client terminals which are connectable to the client terminal C. The response signal indicative of "WAIT" is transmitted when the CPU 21 temporarily reserves a response to the connection request from the client terminal C. Typically, the response signal indicative of "WAIT" is transmitted when the user terminal A has not received yet, from the client terminal, a response signal d for a connection request which has been transmitted from the user terminal A to another client terminal (e.g. the client terminal D).

Figure 7:
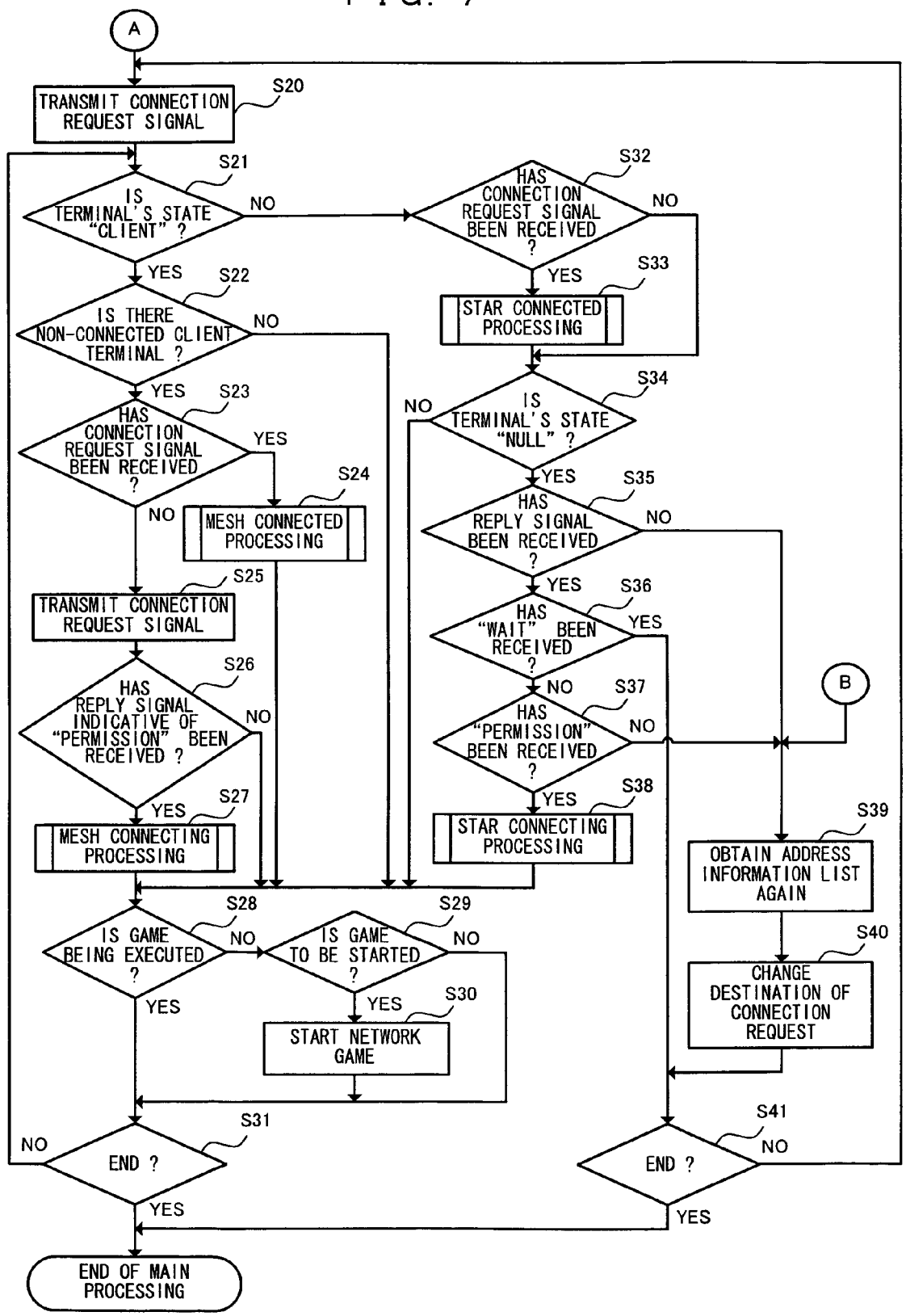
FIG. 7 is a flow chart showing the procedure of the main processing of the network construction program.
Figure 8:
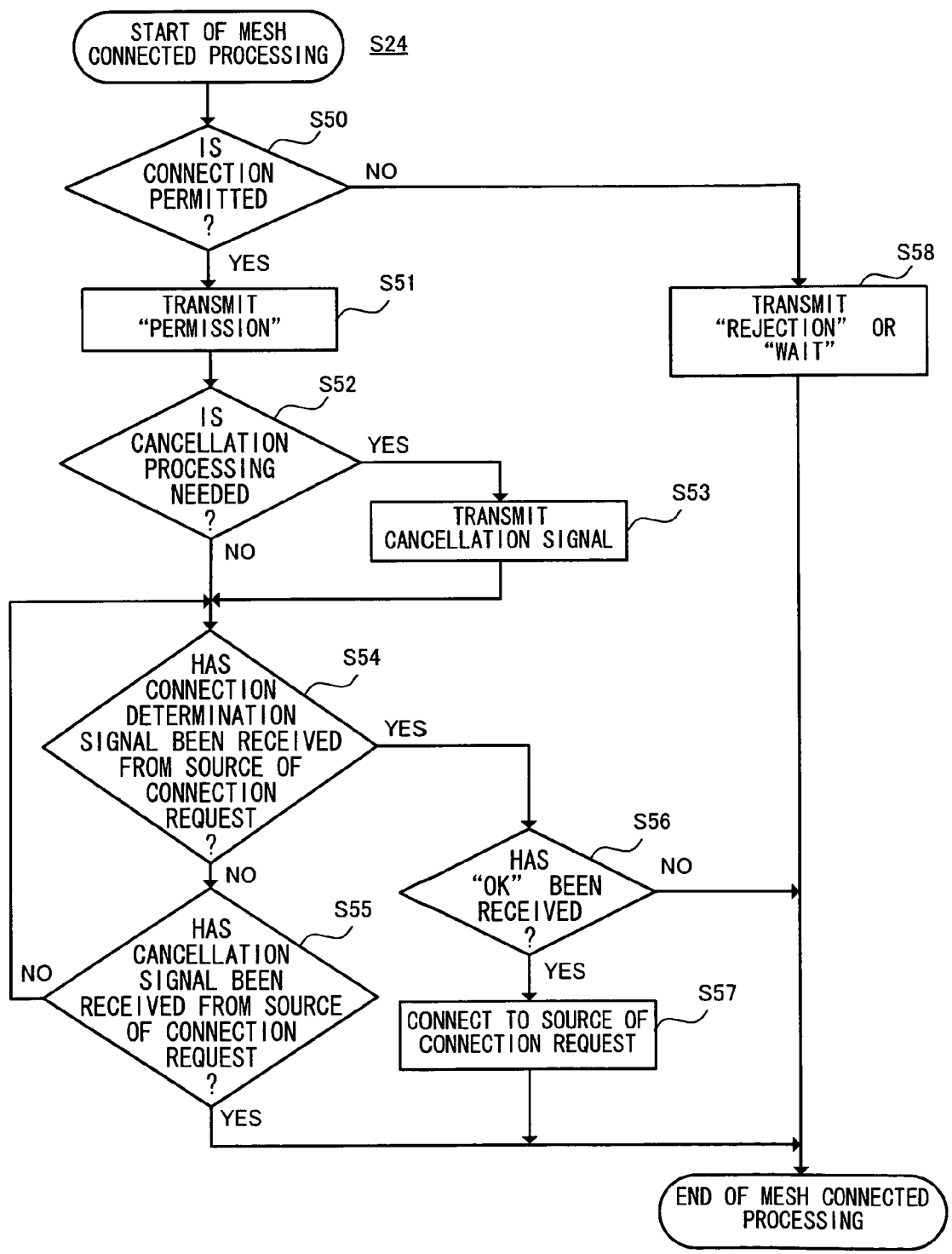
FIG. 8 is a flow chart showing a procedure of mesh connected processing of the network construction program.

When the mesh connected processing at the step S24 is completed, the CPU 21 proceeds to the step S28 in FIG. 7.

At the step S25, the CPU 21 selects one client terminal (for the sake of convenience, referred to as a client terminal D) from client terminals each of which has not established a connection to the user terminal A yet, and transmits a connection request signal to the selected client terminal. The transmitted connection request signal is a connection request signal for constructing a mesh peer-to-peer network. A manner of selecting a client terminal, to which a connection request signal is to be transmitted, from the client terminals each of which has not established the connection to the user terminal A yet includes various manners. As an example, a client terminal having the smallest terminal ID value may be selected, a client terminal having the largest user ID value may be selected, or selection may be made in a random manner by using a random number. As another example, a client terminal which is added to the star peer-to-peer network (i.e. connected to the host terminal) at the earliest time (for the sake of convenience, referred to as a "client terminal E" may be selected. Since the time when the client terminal E is added to the star peer-to-peer network is the earliest, it means that a connection state of the client terminal E is stable (i.e. that there is a high possibility that connections between the client terminal E and the other client terminals have already been established). Thus, there is a low possibility that a plurality of client terminals transmit connection requests to the client terminal E, and there is a high possibility that a connection request to the client terminal E is accepted. Therefore, by transmitting the connection request signal to the client terminal E, a mesh peer-to-peer network can be efficiently constructed. Further, as another example, a client terminal which has established connections to the most other client terminals may be selected.

At the step S26, the CPU 21 determines whether or not the CPU21 has received a response signal indicative of "PERMISSION" from the client terminal D. When the CPU 21 has received the response signal indicative of "PERMISSION", the CPU 21 proceeds to a step S27. When the CPU 21 has not received the response signal indicative of "PERMISSION" yet (i.e. when the CPU 21 has not received any response signal yet or has received the response signal indicative of "REJECTION" or "WAIT", the CPU 21 proceeds to the step S28.

Figure 9:
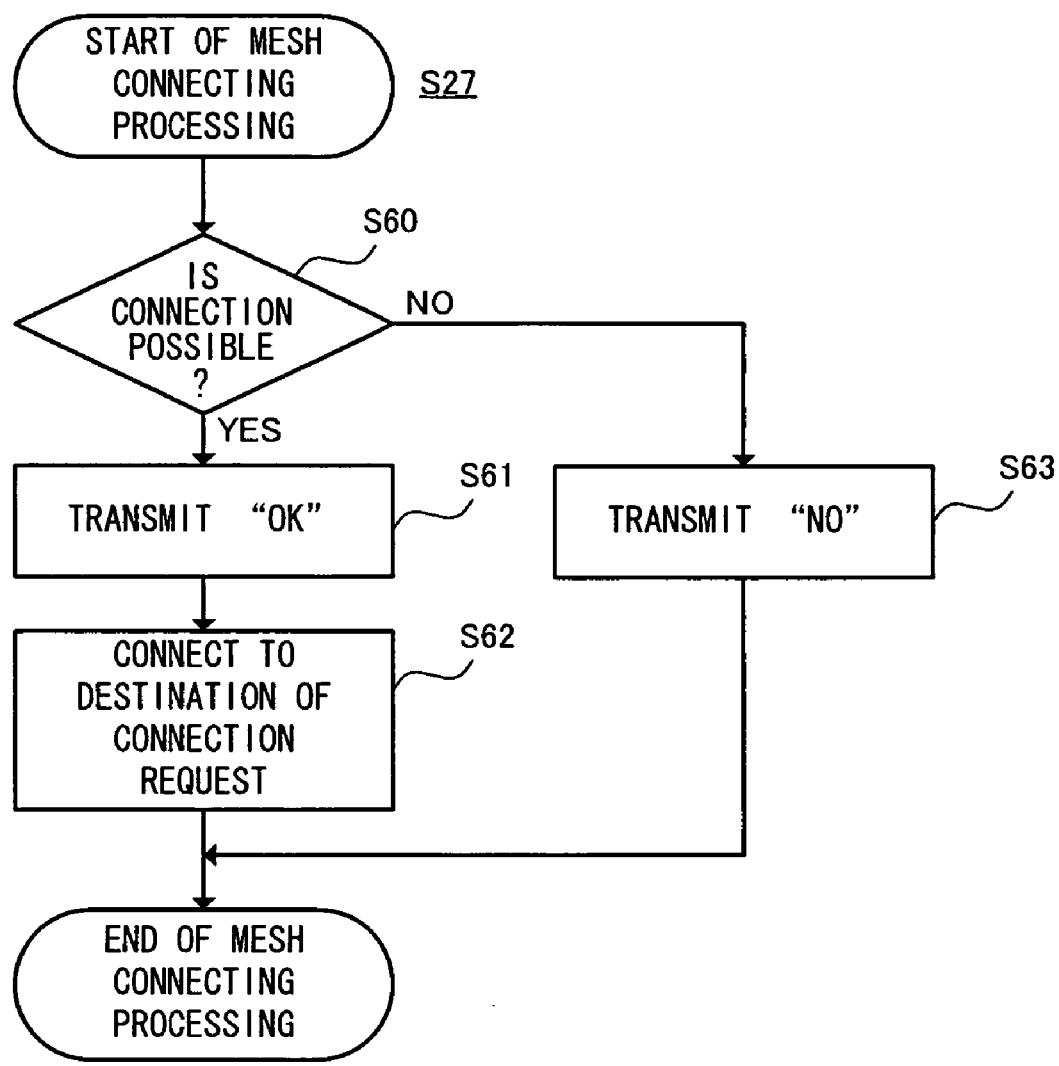
FIG. 9 is a flow chart showing a procedure of mesh connecting processing of the network construction program.
Figure 10:
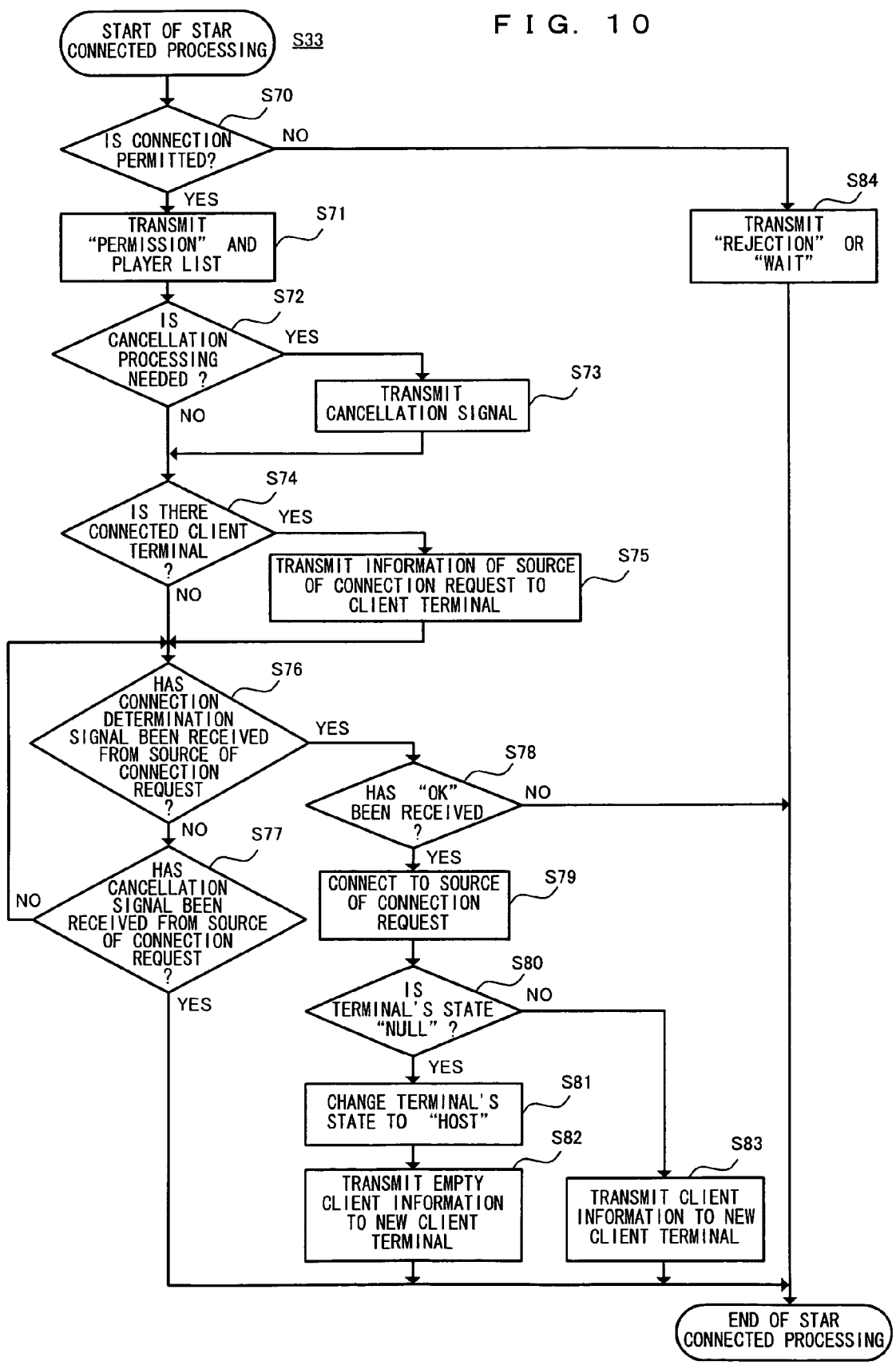
FIG. 10 is a flow chart showing a procedure of star connected processing of the network construction program.

At the step S27, the CPU 21 executes mesh connecting processing. The mesh connecting processing is a series of processing which is executed when the connection request signal (a connection request signal for constructing a mesh peer-to-peer network) transmitted by the user terminal A is accepted by another client terminal (here, the client terminal D). With reference to FIG. 9, the following will describe the mesh connecting processing in detail.

When the mesh connecting processing is started, at a step S60, the CPU 21 determines whether or not it is possible to connect to the client terminal D. When it is possible to connect to the client terminal D, the CPU 21 proceeds to a step S61. When it is not possible to connect to the client terminal D, the CPU 21 proceeds to a step S63.

At the step S61, the CPU 21 transmits a connection determination signal indicative of "OK" to the client terminal D.

At a step S62, the CPU 21 establishes a connection to the client terminal D, and terminates the mesh connecting processing.

At the step S63, the CPU 21 transmits a connection determination signal indicative of "NO" to the client terminal D, and terminates the mesh connecting processing.

When the mesh connecting processing at the step S27 is completed, the CPU 21 proceeds to the step S28 in FIG. 27.

At the step S28, the CPU 21 determines whether or not the network game is being executed. When the network game is being executed, the CPU 21 proceeds to a step S31. When the network game has not been started yet, the CPU 21 proceeds to a step S29.

At the step S29, the CPU 21 determines whether or not a condition for starting the network game is satisfied. When the condition for starting the network game is satisfied, the CPU 21 proceeds to a step S30. When the condition for starting the network game is not satisfied, the CPU 21 proceeds to the step S31. The condition for starting the network game includes various conditions. For example, when a predetermined time period elapses after a star peer-to-peer network starts to be constructed (or after a game session is created by the host terminal), the network game may be started. As another example, when a number of user terminals 20 which are connected to the star peer-to-peer network reaches a predetermined number, the network game may be started. Further, as another example, the network game may be started at a timing which is determined by the host terminal. In this case, a game start signal is transmitted from the host terminal to the client terminals, and the network game is started. Further, as another example, the network game may be started in accordance with a game start instruction inputted from an input section which is provided in the host terminal (e.g. in accordance with pressing a start switch on a controller by a player of the host terminal).

At the step S30, the CPU 21 starts executing the network game program to start the network game. It is noted that the network game program is executed with the execution of the network construction program, and the game network construction processing continues to be executed after the network game is started. Processing of transferring game data between the user terminals 20 during the advance of the network game will be described in detail later.

At the step S31, the CPU 21 determines whether or not the game network construction processing is to be terminated. When the game network construction processing is to be terminated, the CPU 21 terminates the main processing.

When the game network construction processing is not to be terminated, the CPU 21 returns to the step S21.

Steps S32 to S41 are processing for constructing a star peer-to-peer network by establishing a connection between user terminals 20, a terminal's state of each of which is "NULL", or by establishing a connection between a user terminal 20, a terminal's state of which is "HOST", and a user terminal 20, a terminal's state of which is "NULL".

At the step S32, the CPU 21 determines whether or not the CPU 21 has received a connection request signal (a connection request signal for constructing a star peer-to-peer network) from another user terminal 20. When the CPU 21 has received the connection request signal from the other user terminal 20, the CPU 21 proceeds to the step S33. When the CPU 21 has not received the connection request signal from the other user terminal 20 yet, the CPU 21 proceeds to the step S34.

At the step S33, the CPU 21 executes star connected processing. The star connected processing is a series of processing which is executed when the user terminal A receives the connection request signal (a connection request signal for constructing a star peer-to-peer network) from the other user terminal 20. With reference to a flow chart in FIG. 10, the following will describe the star connected processing in detail.

When the star connected processing is started, at a step S70, the CPU 21 determines whether or not a connection request from the other user terminal 20 (for the sake of convenience, referred to as a "user terminal F"), which is a source of the connection request signal, is acceptable (i.e. whether or not to establish a connection between the user terminal A and the user terminal F). When the connection request is acceptable, the CPU 21 proceeds to a step S71. When the connection request is not acceptable, the CPU 21 proceeds to a step S84. It is noted that there may be a situation where the user terminal A has not received yet, from the user terminal B, a response signal for the connection request signal which has been transmitted from the user terminal A to the user terminal B at the aforementioned step S20. In this situation, based on predetermined criteria, the CPU 21 determines whether or not the connection request from the user terminal F is acceptable. For example, determination may be made based on a comparison in magnitude between a terminal ID of the user terminal F and a terminal ID of the user terminal B. Alternatively, determination may be made based on a comparison in magnitude between a user ID of a user using the user terminal F and a user ID of a user using the user terminal B. As another example, in the situation where the user terminal A has not received the response signal from the user terminal B yet, the CPU 21 may always reject the connection request from the user terminal F, or may always accept the connection request from the user terminal F (i.e. may prioritizes establishment of a connection to the user terminal F over establishment of a connection to the user terminal B).

At the step S71, the CPU 21 transmits a response signal indicative of "PERMISSION" and the player list, which is stored in the RAM 22, to the user terminal F.

At a step S72, the CPU 21 determines whether or not there is a need to execute cancellation processing. When there is the need to execute the cancellation processing, the CPU 21 proceeds to a step S73. When there is no need to execute the cancellation processing, the CPU 21 proceeds to a step S74. Here, the cancellation processing is processing for notifying the user terminal B of cancellation of the connection request when the CPU 21 determines at the step S70 that the connection request from the user terminal F is acceptable before receiving, from the user terminal B, a response signal for the connection request signal which has been transmitted from the user terminal A to another user terminal (here, the user terminal B) at the aforementioned step S20.

At the step S73, the CPU 21 transmits a cancellation signal to the user terminal B.

At the step S74, the CPU 21 determines whether or not there is a client terminal which has been connected to the user terminal A. When there is the client terminal which has been connected to the user terminal A (i.e. when the user terminal A has already operated as the host terminal), the CPU 21 proceeds to a step S75. When there is no client terminal which has been connected to the user terminal A, the CPU 21 proceeds to a step S76.

At the step S75, the CPU 21 transmits information (an IP address, and the like) of the user terminal F to all of the client terminals which have been connected to the user terminal A. It is noted that the information of the user terminal F is included in the connection request signal which is received by the user terminal A from the user terminal F.

At the step S76, the CPU 21 determines whether or not the CPU 21 has received a connection determination signal from the user terminal F. When the CPU 21 has received the connection determination signal, the CPU 21 proceeds to a step S78. When the CPU 21 has not received the connection determination signal yet, the CPU 21 proceeds to a step S77.

At the step S77, the CPU 21 determines whether or not the CPU 21 has received a cancellation signal from the user terminal F. When the CPU 21 has received the cancellation signal from the user terminal F, the CPU 21 terminates the star connected processing. When the CPU 21 has not received the cancellation signal from the user terminal F yet, the CPU 21 returns to the step S76.

At the step S78, the CPU 21 determines whether or not the connection determination signal received from the user terminal F is indicative of "OK". When the connection determination signal is indicative of "OK", the CPU 21 proceeds to a step S79. When the connection determination signal is indicative of "NO", the CPU 21 terminates the star connected processing.

At the step S79, the CPU 21 establishes a connection to the user terminal F. Thus, the user terminal F newly participates, as a client terminal, the game session which is created by the user terminal A.

At a step S80, the CPU 21 determines whether or not the terminal's state, which is stored in the RAM 22, is indicative of "NULL". When the terminal's state is "NULL", the CPU 21 proceeds to a step S81. When the terminal's state is not "NULL" (i.e. when the terminal's state is "HOST"), the CPU 21 proceeds to a step S83.

At the step S81, the CPU 21 changes the terminal's state, which is stored in the RAM 22, to "HOST".

At a step S82, the CPU 21 transmits "empty client information" to the user terminal F which has newly become the client terminal, and terminates the star connected processing. It is noted that the "client information" is information (an IP address, and the like) of the client terminal which has been connected to the user terminal A. Although information of existing client terminals is normally transmitted as "client information" to a new client terminal, since the user terminal A has just become a host terminal and there is no existing client terminal, the "empty client information" is transmitted for notifying the user terminal F, which is a new client terminal, of that effect.

At the step S83, the CPU 21 transmits information of existing client terminals as "client information" to the user terminal F which has newly become the client terminal, and terminates the star connected processing.

At the step S84, the CPU 21 transmits a response signal indicative of "REJECTION" or "WAIT" to the user terminal F, and terminates the star connected processing. The response signal indicative of "REJECTION" is transmitted when the CPU 21 completely rejects the connection request from the user terminal F. Typically, the response signal indicative of "REJECTION" is transmitted when a number of client terminals which are connected to the user terminal F exceeds a predetermined maximum number of client terminals which are connectable to the user terminal F. The response signal indicative of "WAIT" is transmitted when the CPU 21 temporarily reserves a response to the connection request from the user terminal F. Typically, the response signal indicative of "WAIT" is transmitted when the user terminal A has not received yet, from the user terminal B, a response signal for a connection request which has been transmitted from the user terminal A to another client terminal (e.g. the user terminal B).

When the star connected processing at the step S33 is completed, the CPU 21 proceeds to the step S34 in FIG. 7.

At the step S34, the CPU 21 determines whether or not the terminal's state, which is stored in the RAM 22, is "NULL". When the terminal's state is "NULL", the CPU 21 proceeds to the step S35. When the terminal's state is not "NULL" (i.e. when the terminal's state is "HOST"), the CPU 21 proceeds to the aforementioned step S28.

At the step S35, the CPU 21 determines whether or not the CPU 21 has received, from the user terminal B, a response signal (including the player list) for the connection request signal which has been transmitted at the step S20. When the CPU 21 has received the response signal, the CPU 21 proceeds to the step S36. When the CPU 21 has not received the response signal yet, the CPU 21 proceeds to the step S39.

At the step S36, the CPU 21 determines whether or not the response signal from the user terminal B is indicative of "WAIT". When the response signal is indicative of "WAIT", the CPU 21 proceeds to the step S41. When the response signal is not indicative of "WAIT" (i.e. when the response signal is indicative of "PERMISSION" or "REJECTION"), the CPU 21 proceeds to the step S37.

At the step S37, the CPU 21 determines whether or not the response signal from the user terminal B is indicative of "PERMISSION". When the response signal is indicative of "PERMISSION", the CPU 21 proceeds to the step S38. When the response signal is not indicative of "PERMISSION" (i.e. when the response signal is indicative of "REJECTION"), the CPU 21 proceeds to the step S39.

At the step S38, the CPU 21 executes star connecting processing. The star connecting processing is a series of processing which is executed when the connection request signal (a connection request signal for constructing a star peer-to-peer network) transmitted by the user terminal A is accepted by another user terminal (here, the user terminal B). With reference to a flow chart in FIG. 11, the following will describe the star connecting processing in detail.

When the star connecting processing is started, at a step S90, the CPU 21 determines whether or not it is possible to connect to the user terminal B. When it is possible to connect to the user terminal B, the CPU 21 proceeds to a step S91. When it is not possible to connect to the user terminal B, the CPU 21 proceeds to a step S94.

At the step S91, the CPU 21 transmits a connection determination signal indicative of "OK" to the user terminal B.

At a step S92, the CPU 21 establishes a connection to the user terminal B.

At a step S93, the CPU 21 changes the terminal's state, which is stored in the RAM 22, to "CLIENT", and terminates the star connecting processing.

At the step S94, the CPU 21 transmits a connection determination signal indicative of "NO" to the user terminal B, and terminates star connecting processing.

When the star connecting processing at the step S38 is completed, the CPU 21 proceeds to the aforementioned step S28 in FIG. 7.

At the step S39, similarly at the step S13, the CPU 21 obtains the address information list from the address information server 10.

At the step S40, the CPU 21 changes the destination of the connection request based on the address information list which is obtained from the address information server 10.

At the step S41, the CPU 21 determines whether or not the game network construction processing is to be terminated. When the game network construction processing is to be terminated, the CPU 21 terminates the main processing. When the game network construction processing is not to be terminated, the CPU 21 returns to the step S20.

As described above, in the present embodiment, after the star peer-to-peer network is constructed by the star connected processing at the step S33 and the star connecting processing at the step S38, connections between the client terminals of the star peer-to-peer network are gradually established, and finally, the complete peer-to-peer network is completed.

The following will describe in detail an operation of the user terminal 20 during the execution of the network game program. The operation of the user terminal 20 (the processing of transmission and reception of game data) during the execution of the network game program is different between the client terminal and the host terminal.

Figure 12:
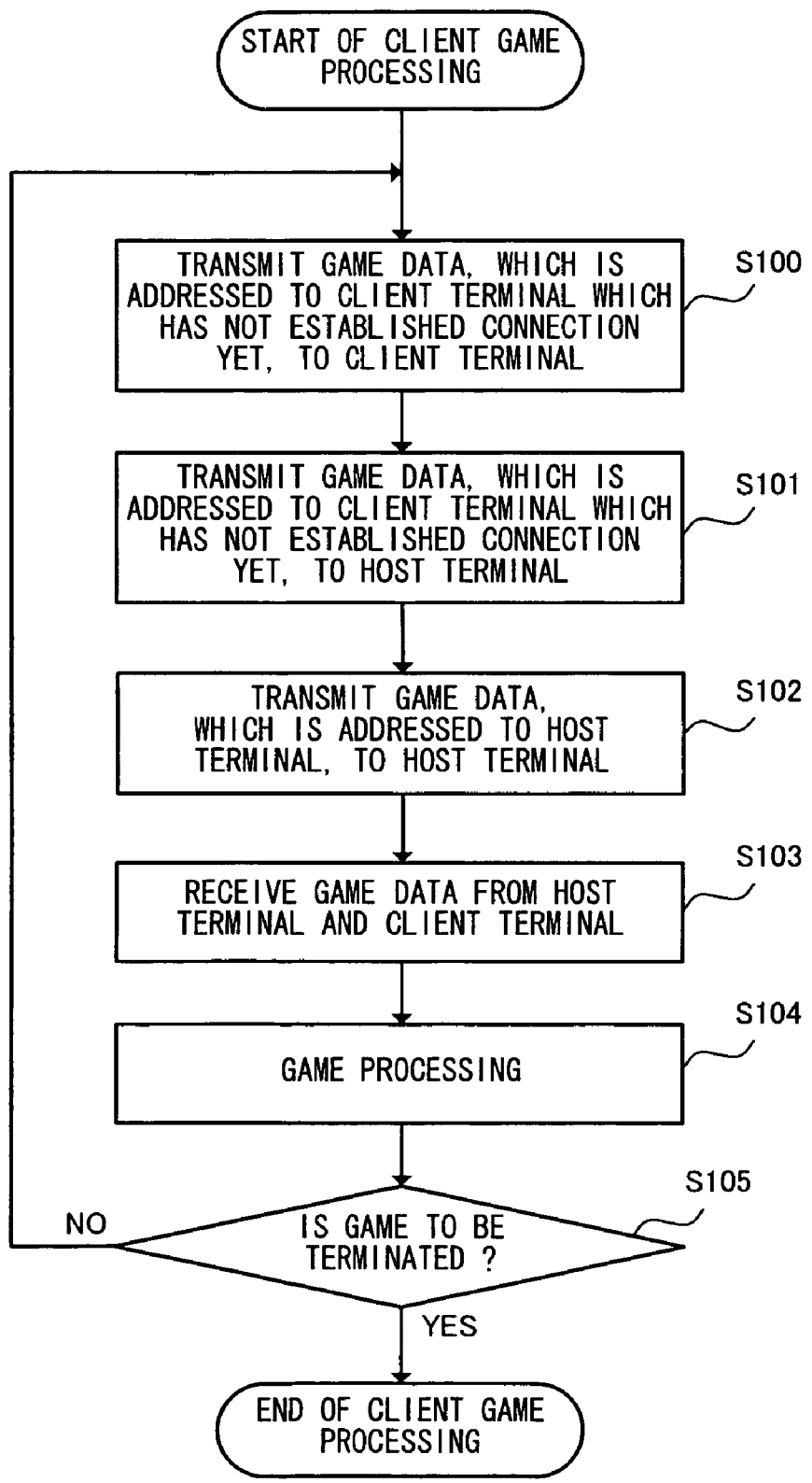
FIG. 12 is a flow chart showing a procedure of client game processing of a network game program.

FIG. 12 is a flow chart showing a procedure of game processing executed by the client terminal (for the sake of convenience, referred to as a "client terminal G").

At a step S100, a CPU 21 of the client terminal G transmits game data (which is required for the network game to advance, for example, operation data indicative of contents of operations of a player with respect to a controller provided in the client terminal G, and the like), which is addressed to a client terminal (for the sake of convenience, referred to as a "client terminal H") which has already established a connection to the client terminal G (i.e. which is communicable directly with the client terminal G, not via the host terminal), to the client terminal H. Whether or not the connection has been established can be recognized by referring to the connection flag which is included in the player list which is stored in the RAM 22. The connection flag is updatable in accordance with the aforementioned network construction program even during the advance of the network game.

At a step S101, the CPU 21 of the client terminal G transmits game date, which is addressed to a client terminal (for the sake of convenience, referred to as a "client terminal I") which has not established a connection to the client terminal G yet, to the host terminal. A signal transmitted to the host terminal includes address information indicative of a destination address of game data (here, the client terminal I).

At a step S102, the CPU 21 of the client terminal G transmits game data, which is addressed to the host terminal, to the host terminal.

At a step S103, the CPU 21 of the client terminal G receives game date from the host terminal and client terminals (here, the client terminal H and the client terminal I).

At a step S104, the CPU 21 of the client terminal G executes the game processing (control of movement of a game character, and the like) by using the game data which are obtained from the other user terminals at the step S103.

At a step S105, the CPU 21 of the client terminal G determines whether or not the network game is to be terminated. When the network game is to be terminated, the CPU 21 terminates the game processing. When the network game is not to be terminated, the CPU 21 returns to the step S100.

In each client terminal, the processing of the above steps S100 to S105 are executed periodically (typically, at a cycle of a sixtieth second), so that the network game advances.

Figure 13:
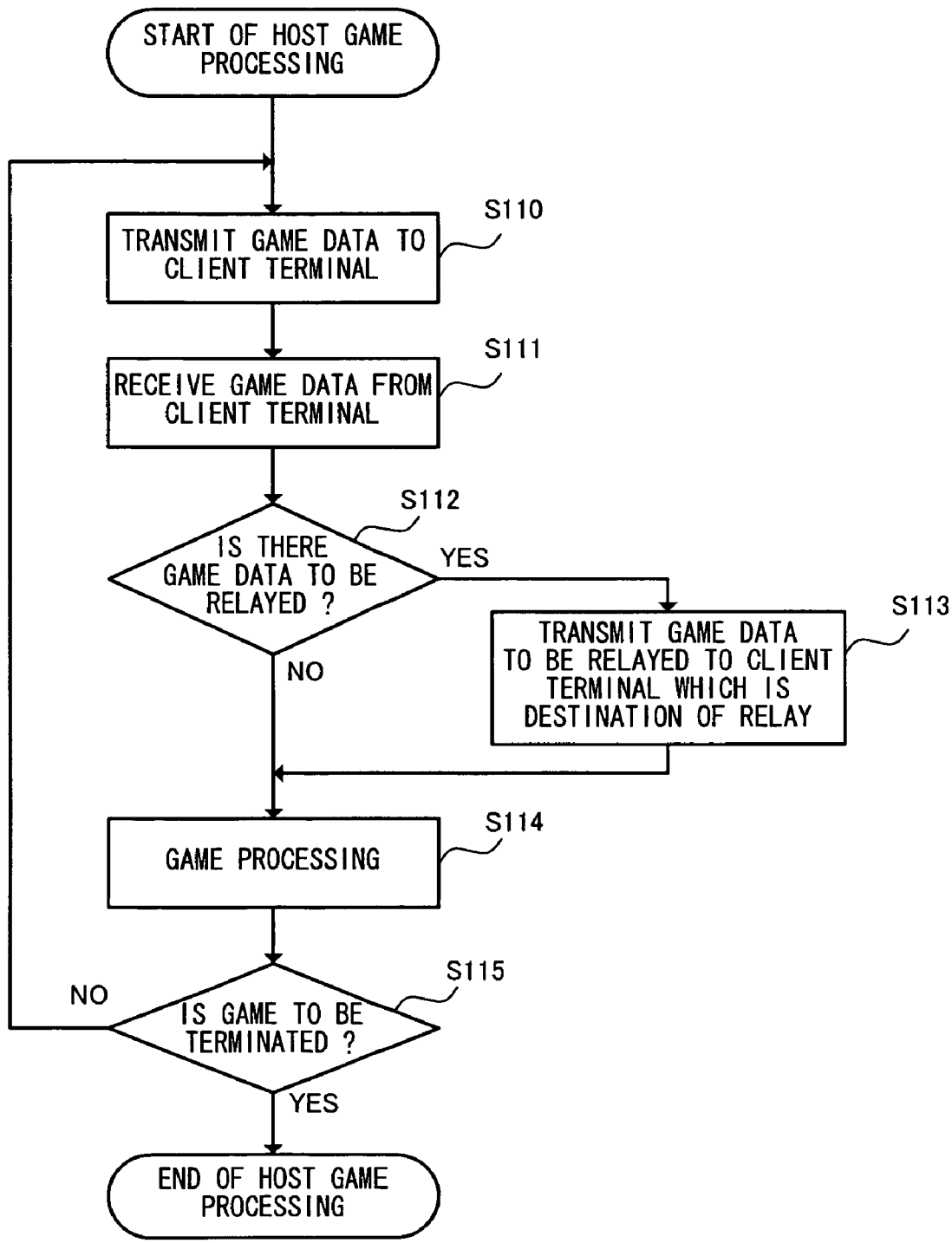
FIG. 13 is a flow chart showing a procedure of host game processing of the network game program.

FIG. 13 is a flow chart showing a procedure of game processing executed by the host terminal.

At a step S110, a CPU 21 of the host terminal transmits game data (which is required for the network game to advance, for example, operation data indicative of contents of operations of a player with respect to a controller provided in the host terminal, and the like), which is addressed to each client terminal (here, addressed to the client terminal G, the client terminal H, and the client terminal I), to each client terminal.

At a step S111, the CPU 21 of the host terminal receives game data from each client terminal.

At a step S112, the CPU 21 of the host terminal determines whether or not the game data received at the step S111 includes game data to be relayed (i.e. game data, a destination of which is specified as any of the client terminals by the aforementioned address information). When there is game data to be relayed, the CPU 21 proceeds to a step S113. When there is no game data to be relayed, the CPU 21 proceeds to a step S114.

At the step S113, the CPU 21 of the host terminal transmits the game data to be relayed to the client terminal which is specified as the destination of the game data.

At the step S114, the CPU 21 of the host terminal executes the game processing (control of movement of a game character, and the like) by using the game data which is received from the other user terminals at the step S111.

At a step S115, the CPU 21 of the host terminal determines whether or not the network game is to be terminated. When the network game is to be terminated, the CPU 21 terminates the game processing. When the network game is not to be terminated, the CPU 21 returns to the step S110.

In the host terminal, the processing of the above steps S110 to S115 are executed periodically (typically, at a cycle of a sixtieth second), so that the network game advances.

As described above, in the present embodiment, while the network game advances, the client terminals which have established connections therebetween transmit and receive game data to and from each other without passing via the host terminal, and the client terminals which have not established connections therebetween yet transmit and receive game data to and from each other via the host terminal. Thus, the network game can be started at least at a time when the star peer-to-peer network is constructed, and a time during which players wait for the network game to start is short. In addition, while the network game is played, the mesh peer-to-peer network is gradually constructed from the star peer-to-peer network. Thus, a processing burden on the host terminal during playing the network game is reduced, and a transfer time of game data which is required for executing the network game can be shortened.

Further, according to the present embodiment, the client terminal can participate the game network as long as the client terminal is connected to the host terminal. Even if a connection between any two of the client terminals fails to be established, the network game can advance as long as these client terminals are connected to the host terminal. Thus, a situation where the network game cannot be started due to failure of constructing a game network is unlikely to occur compared to the conventional game network system which uses a mesh peer-to-peer network.

With reference to FIGS. 14A to 21, the following will describe how the peer-to-peer network is constructed in the present embodiment by using a concrete example.

FIGS. 14A to 14E show a procedure of processing when two user terminals (a user terminal A and a user terminal B) are connected to each other.

Figure 14A:
FIG. 14A is a view showing a process of a peer-to-peer network being constructed.

As shown in FIG. 14A, a connection request signal is transmitted from the user terminal B, which is not connected to any other user terminal, to the user terminal A which is also not connected to any other user terminal.

Figure 14B:
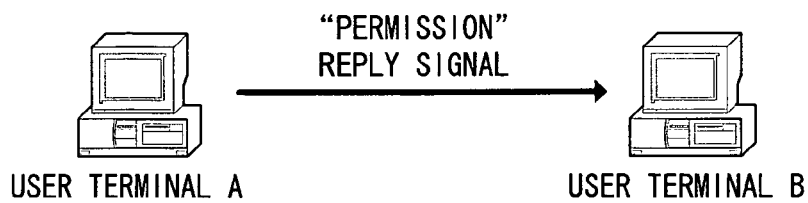
FIG. 14B is a view showing the process of the peer-to-peer network being constructed.

As shown in FIG. 14B, a response signal indicative of "PERMISSION" and a player list are transmitted from the user terminal A to the user terminal B.

Figure 14C:
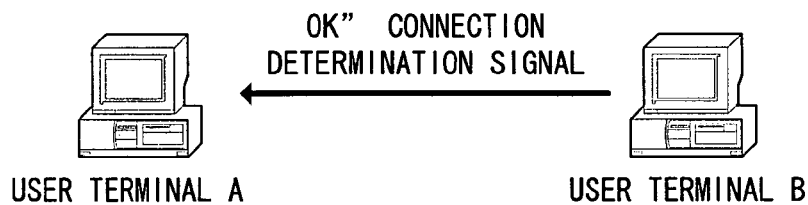
FIG. 14C is a view showing the process of the peer-to-peer network being constructed.

As shown in FIG. 14C, a connection determination signal indicative of "OK" is transmitted from the user terminal B to the user terminal A.

Figure 14D:
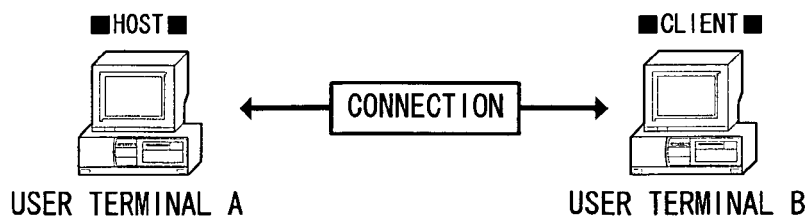
FIG. 14D is a view showing the process of the peer-to-peer network being constructed.

As shown in FIG. 14D, a connection between the user terminal A and the user terminal B is established. After that, the user terminal A operates as a host terminal, and the user terminal B operates as a client terminal.

Figure 14E:
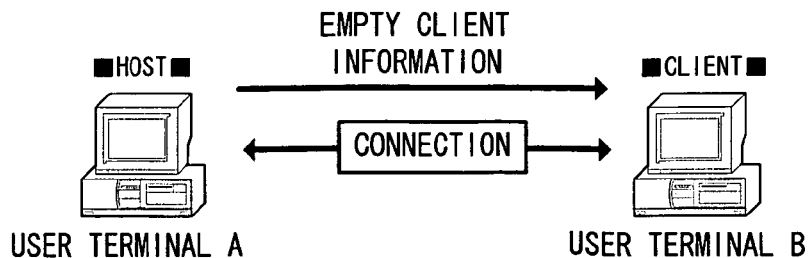
FIG. 14E is a view showing the process of the peer-to-peer network being constructed.

As shown in FIG. 14E, empty client information is transmitted from the user terminal A to the user terminal B. Thus, the user terminal B can recognize that there is not any other client terminal.

As described above, a peer-to-peer network including two user terminals, namely, the user terminal A and the user terminal B is constructed. At this time, the network game can be started at any time according to need.

FIGS. 15A to 15E show a procedure of processing when another user terminal C is further connected to the above-constructed peer-to-peer network including the two user terminals (the user terminal A, and the user terminal B).

Figure 15A:
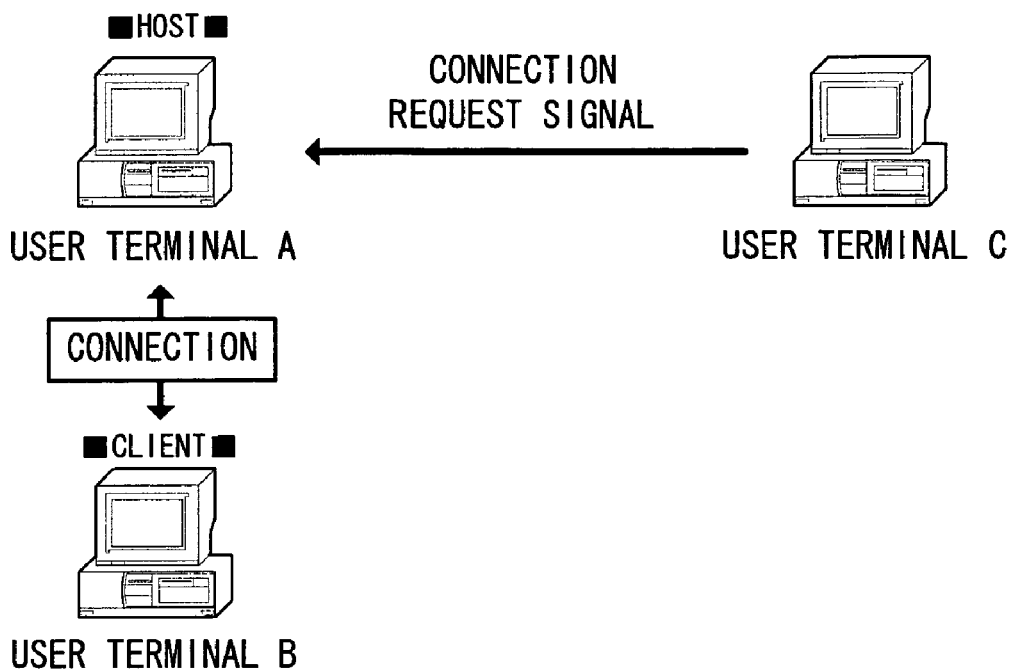
FIG. 15A is a view showing a process of a peer-to-peer network being constructed.

As shown in FIG. 15A, a connection request signal is transmitted from the user terminal C, which is not connected to any other user terminal, to the user terminal A as the host terminal.

Figure 15B:
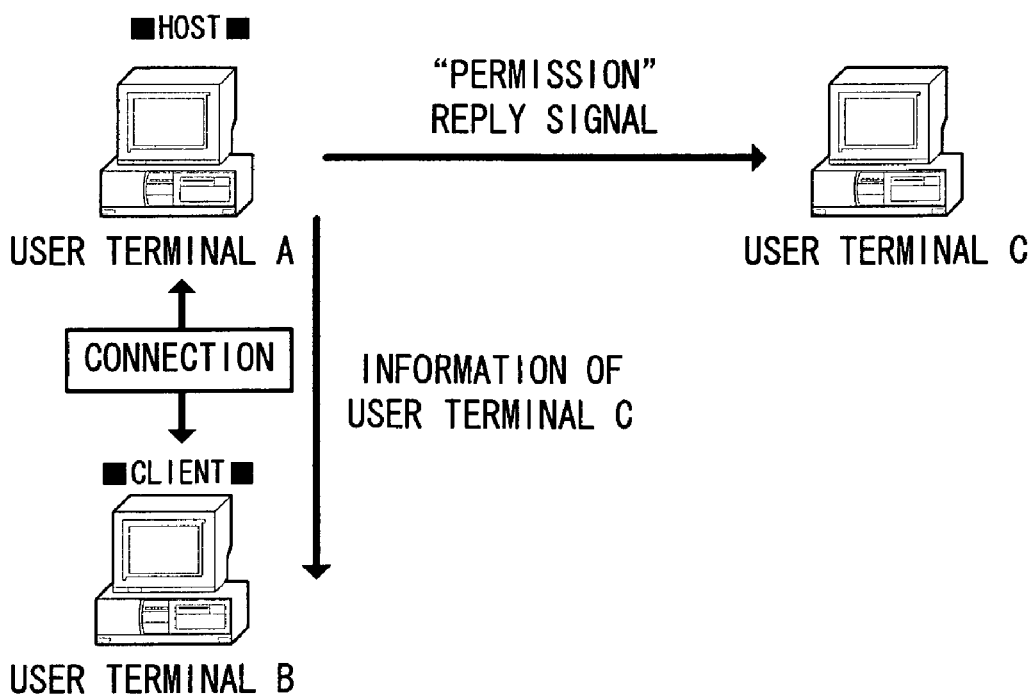
FIG. 15B is a view showing the process of the peer-to-peer network being constructed.

As shown in FIG. 15B, a response signal indicative of "PERMISSION" and the player list are transmitted from the user terminal A to the user terminal C, and information of the user terminal C is transmitted from the user terminal A to the user terminal B.

Figure 15C:
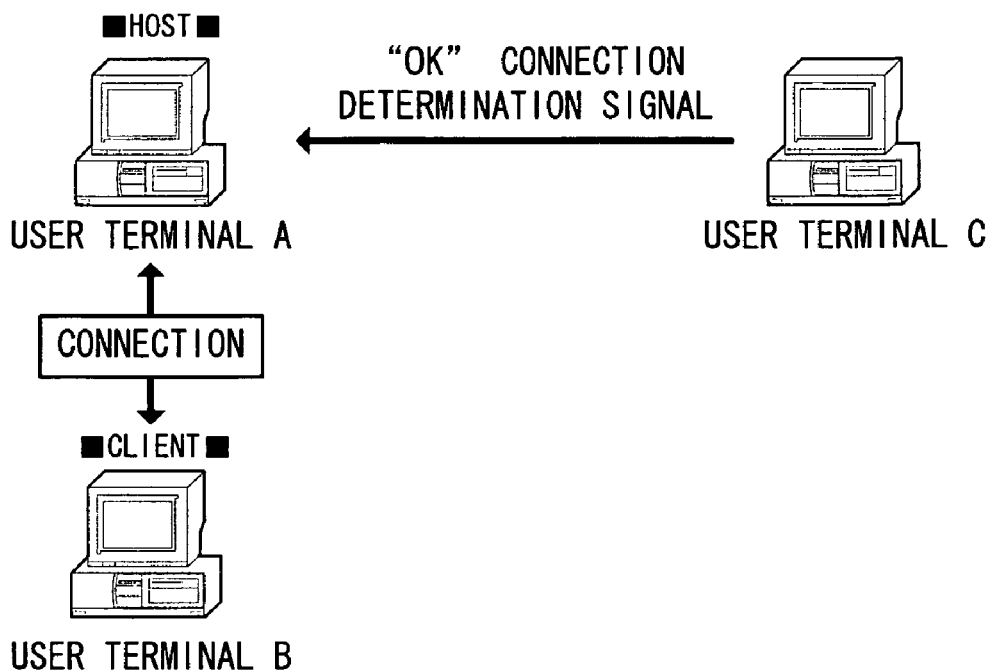
FIG. 15C is a view showing the process of the peer-to-peer network being constructed.

As shown in FIG. 15C, a connection determination signal indicative of "OK" is transmitted from the user terminal C to the user terminal A.

Figure 15D:
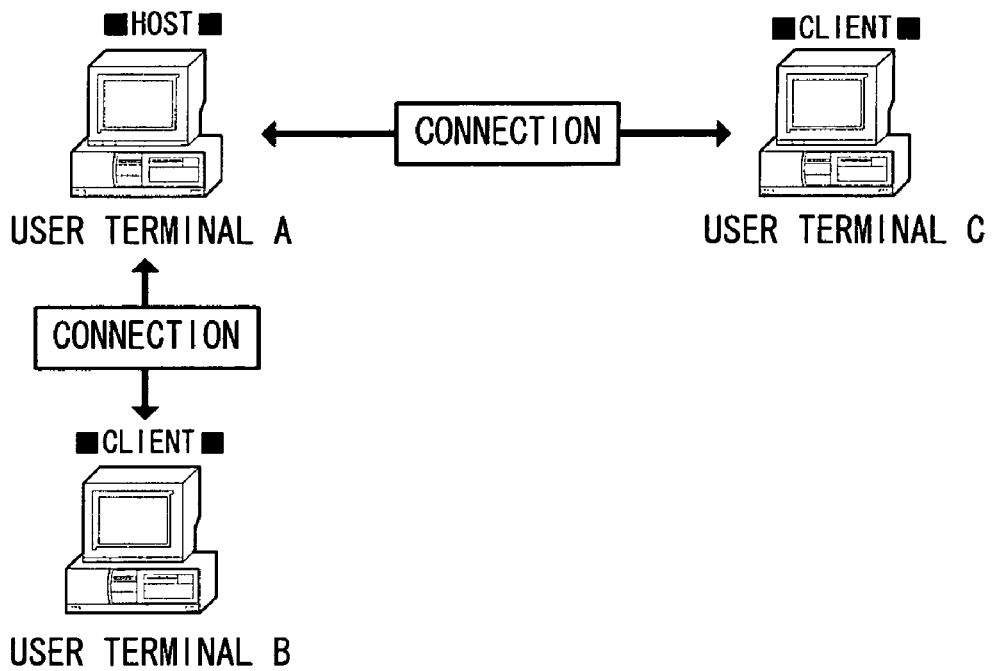
FIG. 15D is a view showing the process of the peer-to-peer network being constructed.

As shown in FIG. 15D, a connection between the user terminal A and the user terminal C is established. After that, the user terminal C operates as a client terminal.

As shown in FIG. 15E, information of the user terminal B is transmitted as client information from the user terminal A to the user terminal C.

As described above, a star peer-to-peer network including three user terminals, namely, the user terminals A to C is constructed.

Immediately after the star peer-to-peer network is constructed, the user terminal B and the user terminal C can transmit and receive game data to and from each other only via the user terminal A as the host terminal.

After the star peer-to-peer network is constructed, regardless of start of the network game, a mesh peer-to-peer network including the three user terminals is constructed.

FIGS. 16A to 16E show a procedure of processing when a mesh peer-to-peer network is constructed from the above-constructed star peer-to-peer network including the three user terminals (the user terminals A to C).

Figure 16A:
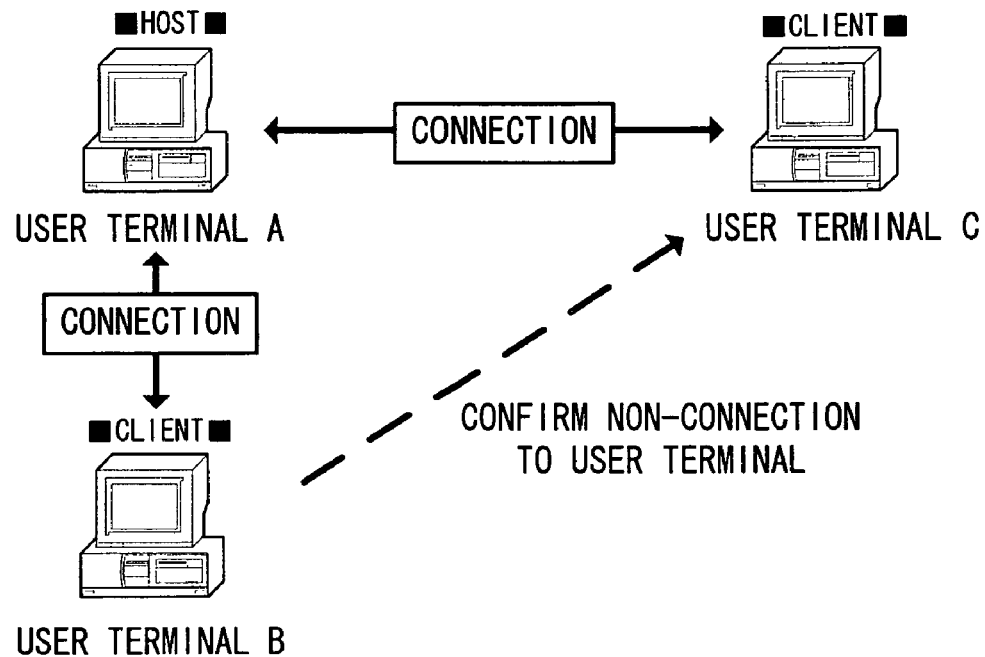
FIG. 16A is a view showing a process of a peer-to-peer network being constructed.

As shown in FIG. 16A, the user terminal B as the client terminal refers to the aforementioned connection flag, and confirms that there is another client terminal (the user terminal C) which has not established a connection to the user terminal B yet.

Figure 16B:
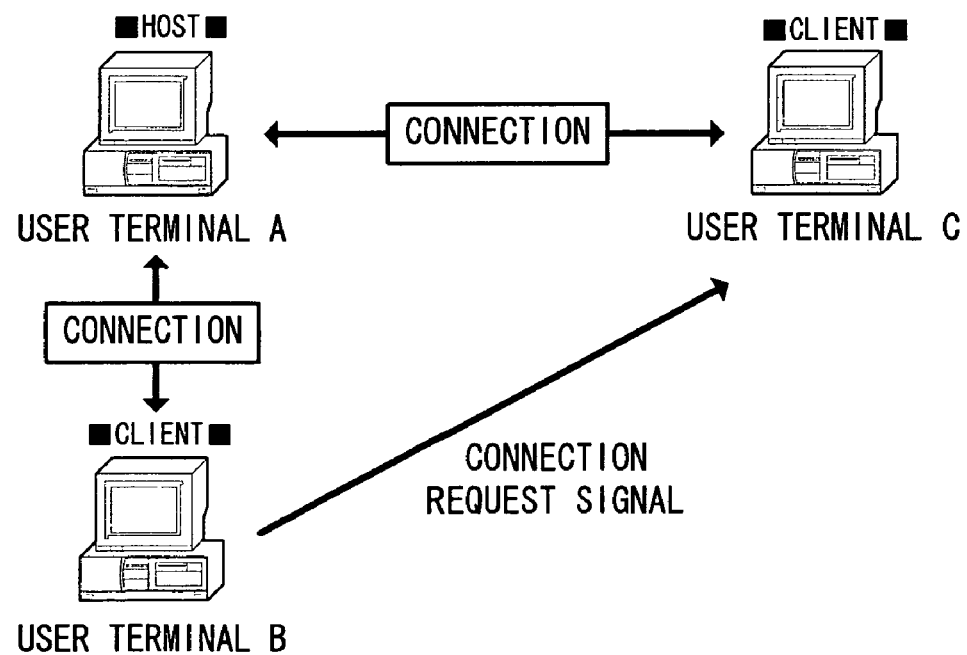
FIG. 16B is a view showing the process of the peer-to-peer network being constructed.

As shown in FIG. 16B, a connection request signal is transmitted from the user terminal B to the user terminal C.

Figure 16C:
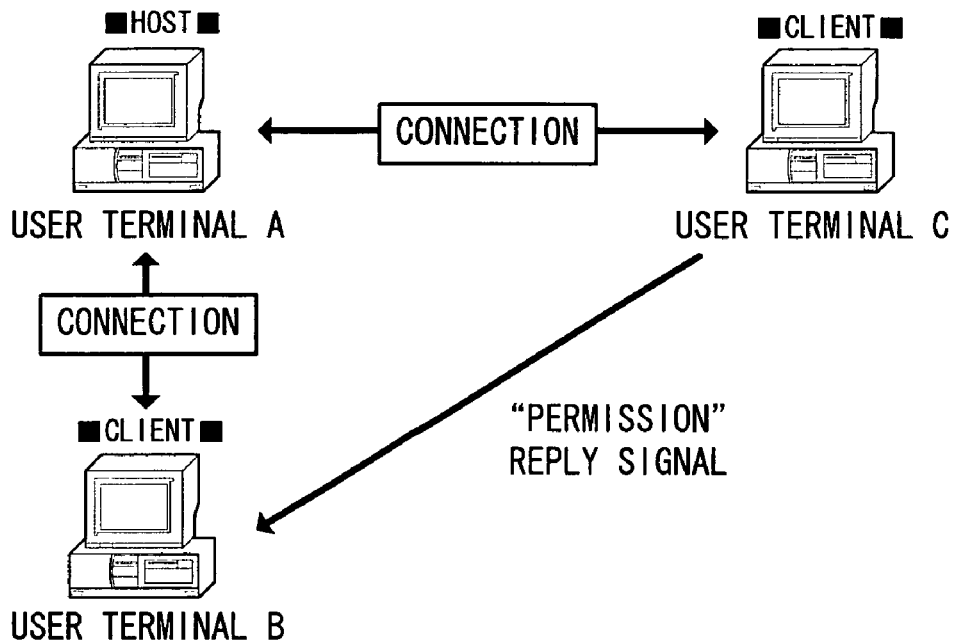
FIG. 16C is a view showing the process of the peer-to-peer network being constructed.

As shown in FIG. 16C, a response signal indicative of "PERMISSION" and the player list are transmitted from the user terminal C to the user terminal B.

Figure 16D:
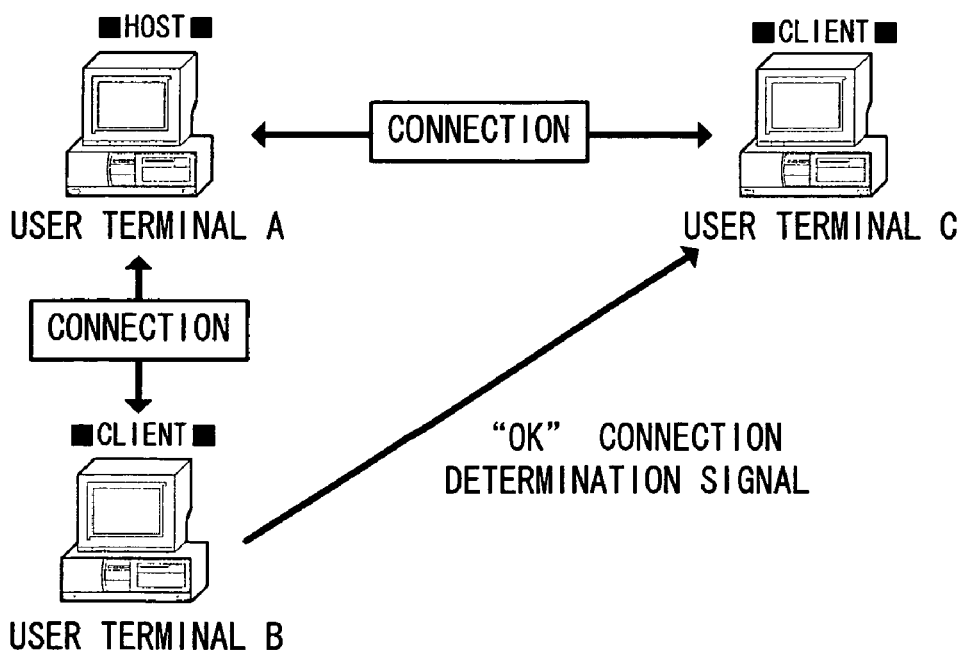
FIG. 16D is a view showing the process of the peer-to-peer network being constructed.

As shown in FIG. 16D, a connection determination signal indicative of "OK" is transmitted from the user terminal B to the user terminal C.

Figure 16E:
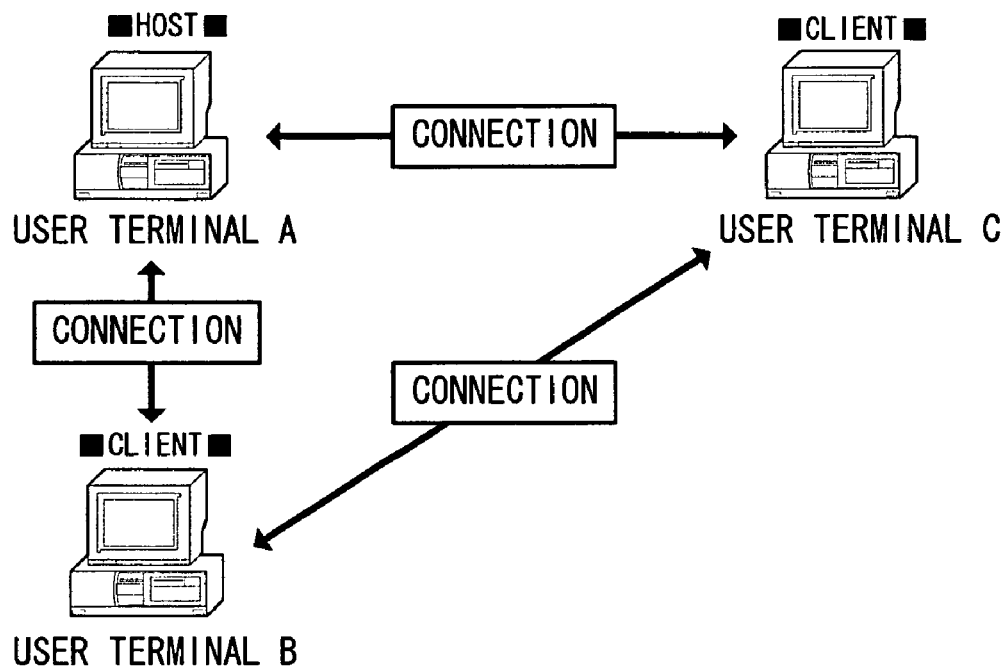
FIG. 16E is a view showing the process of the peer-to-peer network being constructed.

As shown in FIG. 16E, a connection between the user terminal B and the user terminal C is established. After that, the user terminal B and the user terminal C can transmit and receive game data to and from each other without passing via the user terminal A as the host terminal.

With reference to FIGS. 17 to 21, the following will describe a procedure of processing when a peer-to-peer network including four user terminals, namely, the user terminals A to D is constructed.

Figure 17:
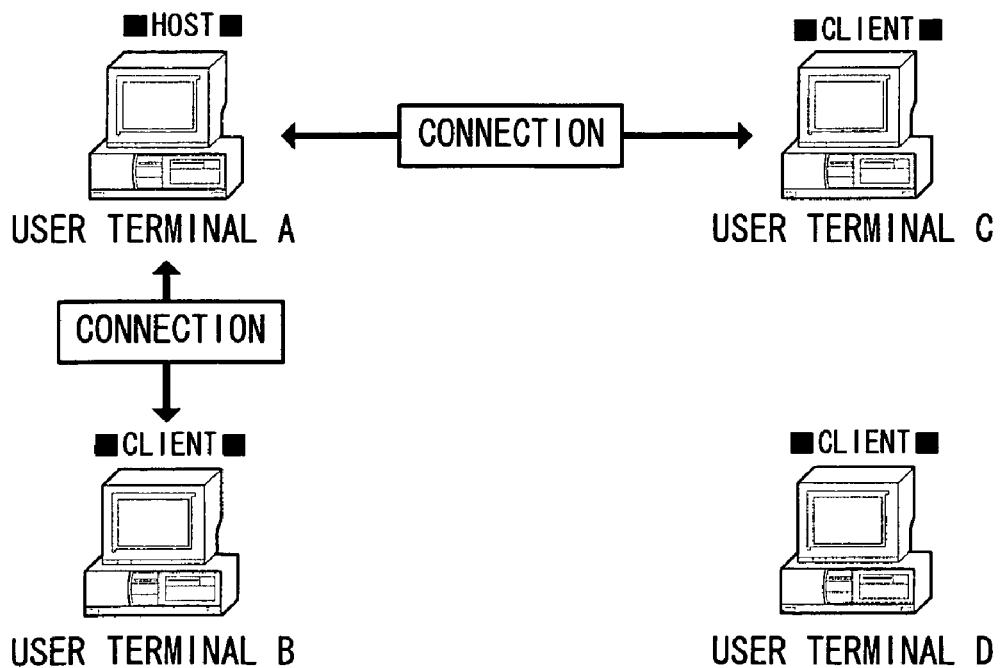
FIG. 17 is a view showing a process of a peer-to-peer network being constructed.

First, as shown in FIG. 17, a star peer-to-peer network including three user terminals, namely, the user terminals A to C is constructed. At this stage, a network game using three user terminals, namely, the user terminals A to C can be started. Then, the procedure of processing changes depending on which of a connection between the user terminal B and the user terminal C and a connection between the user terminal A and the user terminal D is established earlier.

Figures 18, 19:
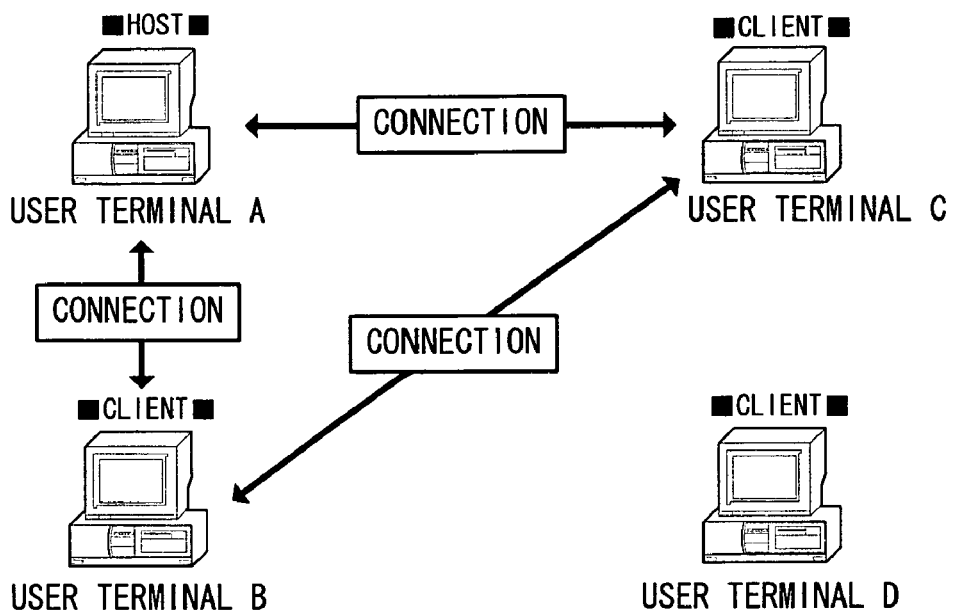
FIG. 18 is a view showing a process of a peer-to-peer network being constructed.
FIG. 19 is a view showing terminal information held by each terminal.
Figure 22:
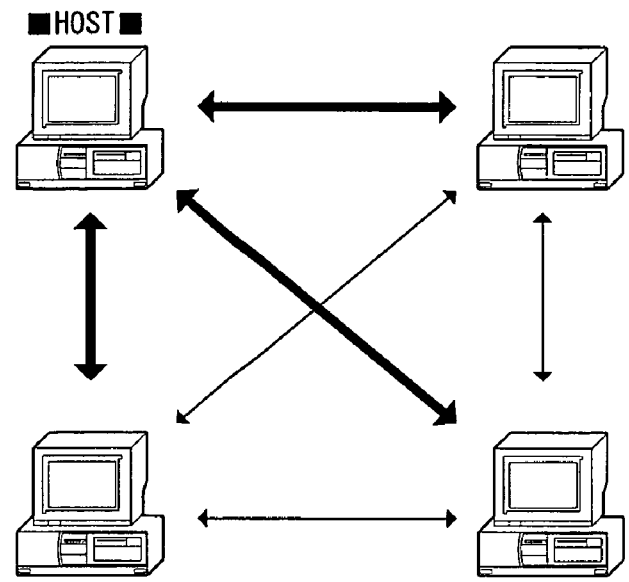
FIG. 22 illustrates an exemplary configuration of a conventional star peer-to-peer network.
Figure 23:
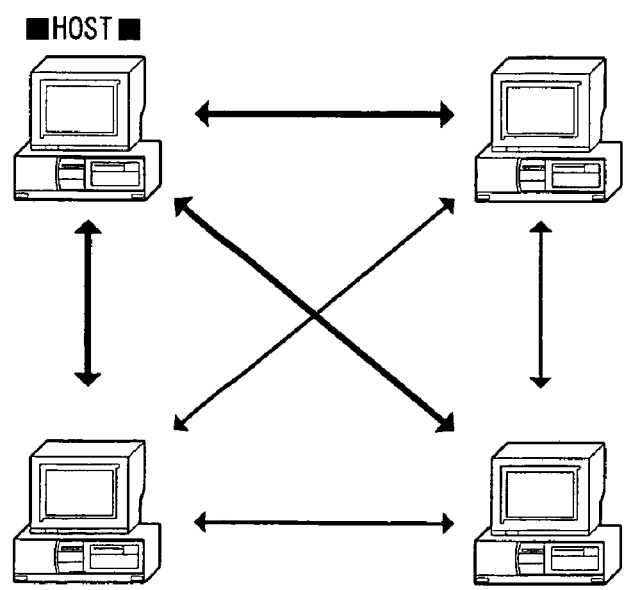
FIG. 23 illustrates an exemplary configuration of a conventional mesh peer-to-peer network.
Figure 24:
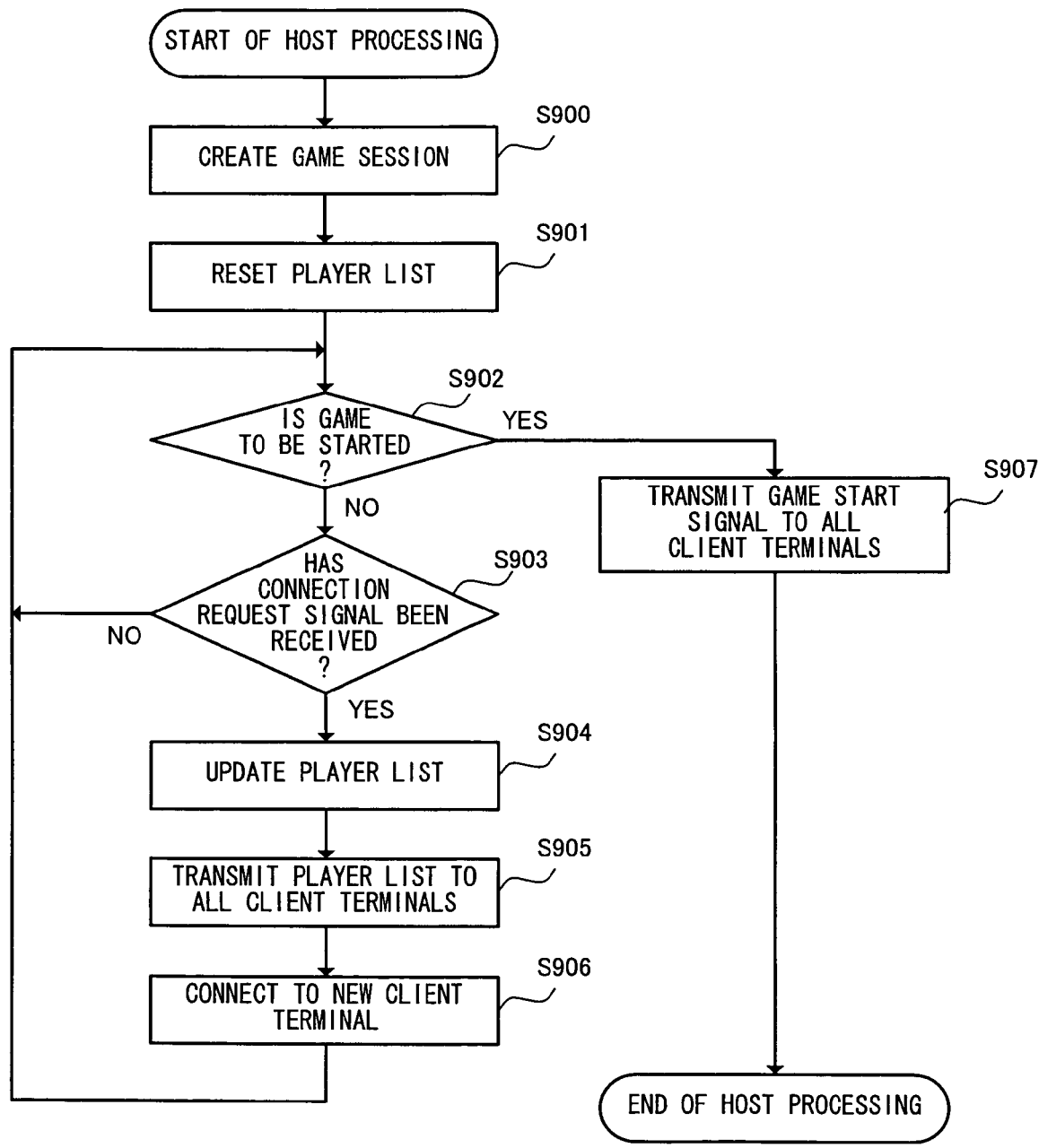
FIG. 24 is a flow chart showing a method of constructing the conventional mesh peer-to-peer network.
Figure 25:
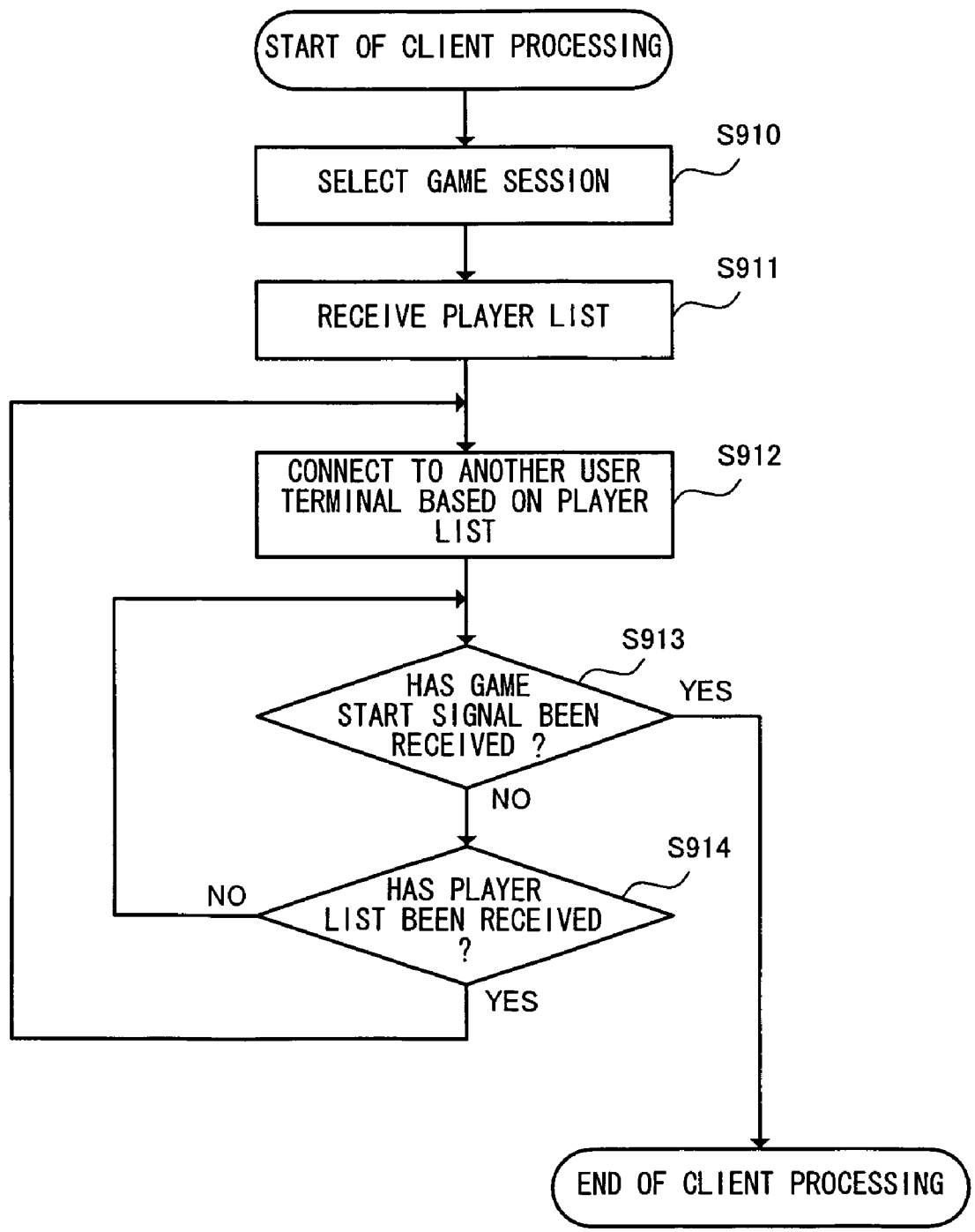
FIG. 25 is a flowchart showing the method of constructing the conventional mesh peer-to-peer network.

FIG. 18 shows a peer-to-peer network when the connection between the user terminal B and the user terminal C is established earlier than the connection between the user terminal A and the user terminal D. FIG. 19 shows information (an IP address, and the like) of other user terminals, which are held by each of the user terminals A to C which belong to the peer-to-peer network at this time. Since the user terminal D is not connected to the peer-to-peer network, information of the user terminal D is not held by any other user terminal. Then, the connection between the user terminal A and the user terminal D is established, and further, a connection between the user terminal D and each of the other client terminals (the user terminal B and the user terminal C) is established sequentially. Finally, the mesh peer-to-peer network including four user terminals, namely, the user terminals A to D is constructed.

FIG. 20 shows a peer-to-peer network when the connection between the user terminal A and the user terminal D is established earlier than the connection between the user terminal B and the user terminal C. FIG. 21 shows information (an IP address, and the like) of other user terminals, which are held by each of the user terminals A to D which belong to the peer-to-peer network at this time. Then, connections between the client terminals (the user terminals B to D) are established sequentially, and finally, the mesh peer-to-peer network including the four user terminals, namely, the user terminals A to D is constructed.

It is noted that according to the present embodiment, the network game can be started at the time when the star peer-to-peer network is constructed, but it takes a certain amount of time until construction of the mesh peer-to-peer network is finished after the star peer-to-peer network is constructed. Since some client terminals transmit and receive game data to and from each other via the host terminal until the construction of the mesh peer-to-peer network is finished, a delay time of communication is large, and a processing burden on the host terminal is great. Thus, preferably, a game sequence of the network game is set, in which processing, which does not require real-time processing, is executed immediately after the network game is started and in which processing, which requires real-time processing, is started when a certain amount of time elapses after the start of the network game. For example, in the case of a racing game played by a plurality of players, preferably, preparation processing for the players to select a racecourse and setup racing cars is executed immediately after the network game is started, and race processing (processing for causing the racing car of each player to run on the common race course) is started after the preparation processing is finished. Since the preparation processing does not require real-time processing (i.e. the user terminals do not need to transmit and receive operation data to and from each other), even when the delay time of communication is large and the processing burden on the host terminal is great, they do not matter much. On the other hand, the race processing requires real-time processing (i.e. the user terminals need to transmit and receive operation data to and from each other according to need). However, since the mesh peer-to-peer network is completed (or almost completed) while the players select a racecourse and set up racing cars, the players can play the racing game comfortably.

In the present embodiment, the address information of another user terminal is obtained from the address information server 10. However, the present invention is not limited thereto, and the address information may be obtained in any other manner.

While the invention has been described in detail, the foregoing description is in all aspects illustrative and not restrictive. It is understood that numerous other modifications and variations can be devised without departing from the scope of the invention.

What is claimed is:

1. A game network construction method for a network game system comprising a plurality of user terminals, the method comprising:
    constructing a star peer-to-peer network in which one of the plurality of user terminals is set as a host terminal and the other of the plurality of user terminals are set as client terminals;
    starting a network game in a plurality of user terminals which have been connected to the star peer-to-peer network;
    constructing a mesh peer-to-peer network from the star peer-to-peer network by sequentially establishing connections between the client terminals which have been connected to the star peer-to-peer network; and
    while the mesh peer-to-peer network is constructed after the network game is started, (a) performing transmission and reception of game data, which is required for the network game to advance, between client terminals which have established a connection therebetween, without passing via the host terminal, and (b) performing transmission and reception of game data, which is required for the network game to advance, between client terminals which have not established a connection therebetween yet, via the host terminal by transfer processing of the host terminal.

2. The game network construction method according to claim 1, wherein each client terminal preferentially connects to a client terminal, which has been connected to the star peer-to-peer network at the earliest time, among the other client terminals which have been connected to the star peer-to-peer network.

3. The game network construction method according to claim 1, wherein each client terminal preferentially connects to a client terminal, to which the most other client terminals have been connected, among the other client terminals which have been connected to the star peer-to-peer network.

4. The game network construction method according to claim 1, further comprising:
    connecting, as a new client terminal, a user terminal which has not been connected to the star peer-to-peer network yet to the star peer-to-peer network while the mesh peer-to-peer network is constructed after the network game is started,
    wherein a mesh peer-to-peer network including the new client terminal is constructed.

5. The game network construction method according to claim 4, wherein the network game is started in a plurality of user terminals, which have been connected to the star peer-to-peer network, at a time when a number of user terminals connected to the star peer-to-peer network reaches a predetermined number.

6. The game network construction method according to claim 1, wherein the network game includes game preparation processing in which settings concerning the network game are made after the network game is started and continues until a predetermined condition is satisfied.

7. The game network construction method according to claim 1, wherein the network game is started in a plurality of user terminals, which have been connected to the star peer-to-peer network, when a predetermined time period elapses after the star peer-to-peer network starts to be constructed.

8. The game network construction method according to claim 1, wherein the network game is started in a plurality of user terminals, which have been connected to the star peer-to-peer network, at a time when a number of user terminals connected to the star peer-to-peer network reaches a predetermined number.

9. The game network construction method according to claim 1, wherein the network game is started in a plurality of user terminals, which have been connected to the star peer-to-peer network, in accordance with a game start signal which is transmitted from the host terminal to the client terminals.

10. The game network construction method according to claim 9, wherein the host terminal transmits the game start signal to the client terminals in accordance with a game start instruction inputted from an input section which is provided in the host terminal.

11. The game network construction method according to claim 1, wherein the mesh peer-to-peer network is constructed from the star peer-to-peer network by sequentially converting the client terminals to the mesh peer-to-peer network by establishing connections between the client terminals so the client terminals communicate directly with each other without the involvement of the host terminal.

12. A game network system comprising:
    a plurality of user terminals, each user terminal having:
        a first connection unit for connecting as a host terminal or a client terminal to a star peer-to-peer network in which one of the plurality of user terminals is set as a host terminal and the other of the plurality of user terminals are set as client terminals;
        a game start unit for starting a network game after connecting to the star peer-to-peer network;
        a second connection unit for sequentially establishing connections to other client terminals, which have been connected to the star peer-to-peer network, after connecting as a client terminal to the star peer-to-peer network; and a game data reception/transmission unit for, after the network game is started, (a) transmitting and receiving game data, which is required for the network game to advance, to and from a client terminal, which has established a connection to said each user terminal, without passing via the host terminal, and (b) transmitting and receiving game data, which is required for the network game to advance, to and from a client terminal, which has not established a connection to said each user terminal yet, via the host terminal by transfer processing of the host terminal.

13. The game network system of claim 12, wherein the mesh peer-to-peer network is constructed from the star peer-to-peer network by sequentially converting the client terminals to the mesh peer-to-peer network by establishing connections between the client terminals so the client terminals communicate directly with each other without the involvement of the host terminal.

14. A non-transitory computer-readable storage medium having stored thereon a game program executed by a computer system of a game apparatus for executing a program to construct a game network, the computer system including one or more computer processors and the game program causing the computer system to execute:

constructing a star peer-to-peer network in which one of the plurality of user terminals is set as a host terminal and the other of the plurality of user terminals are set as client terminals;

starting a network game in a plurality of user terminals which have been connected to the star peer-to-peer network;

constructing a mesh peer-to-peer network from the star peer-to-peer network by sequentially establishing connections between the client terminals which have been connected to the star peer-to-peer network; and while the mesh peer-to-peer network is constructed after the network game is started, (a) performing transmission and reception of game data, which is required for the network game to advance, between client terminals which have established a connection therebetween, without passing via the host terminal, and (b) performing transmission and reception of game data, which is required for the network game to advance, between client terminals which have not established a connection therebetween yet, via the host terminal by transfer processing of the host terminal.

15. The non-transitory computer readable storage medium of claim 14, wherein the mesh peer-to-peer network is constructed from the star peer-to-peer network by sequentially converting the client terminals to the mesh peer-to-peer network by establishing connections between the client terminals so the client terminals communicate directly with each other without the involvement of the host terminal.

* * * * *